E. E. WINKLEY.
AUTOMATIC SHOE MACHINE.
APPLICATION FILED DEC. 14, 1908. RENEWED MAY 7, 1914.
1,129,373.
Patented Feb. 23, 1915.
14 SHEETS—SHEET 1.
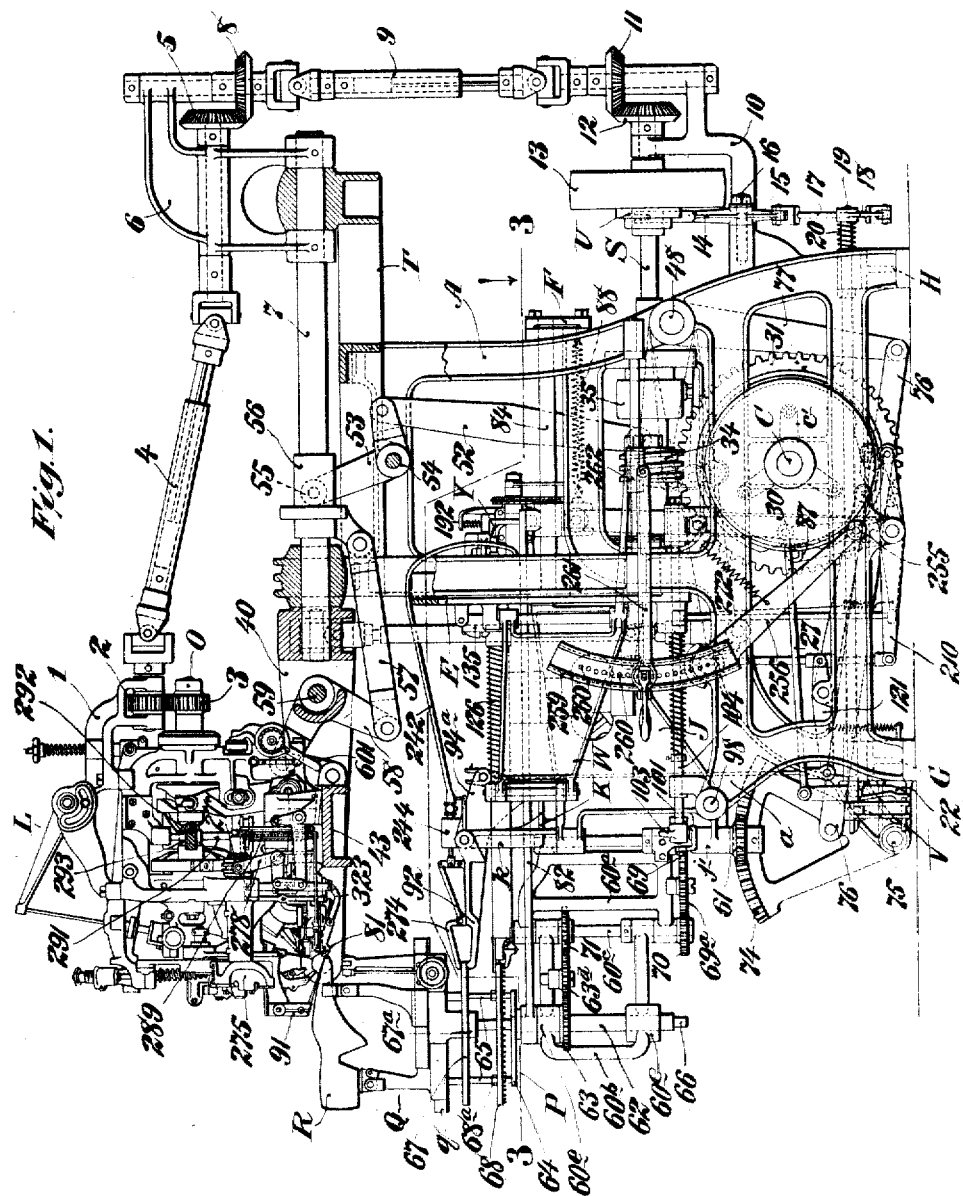
Witnesses:
E. C. Wurdeman
Warno G. Ogden
Inventor:
Erastus E. Winkley
by Phillips Van Everen & Fish
Attys

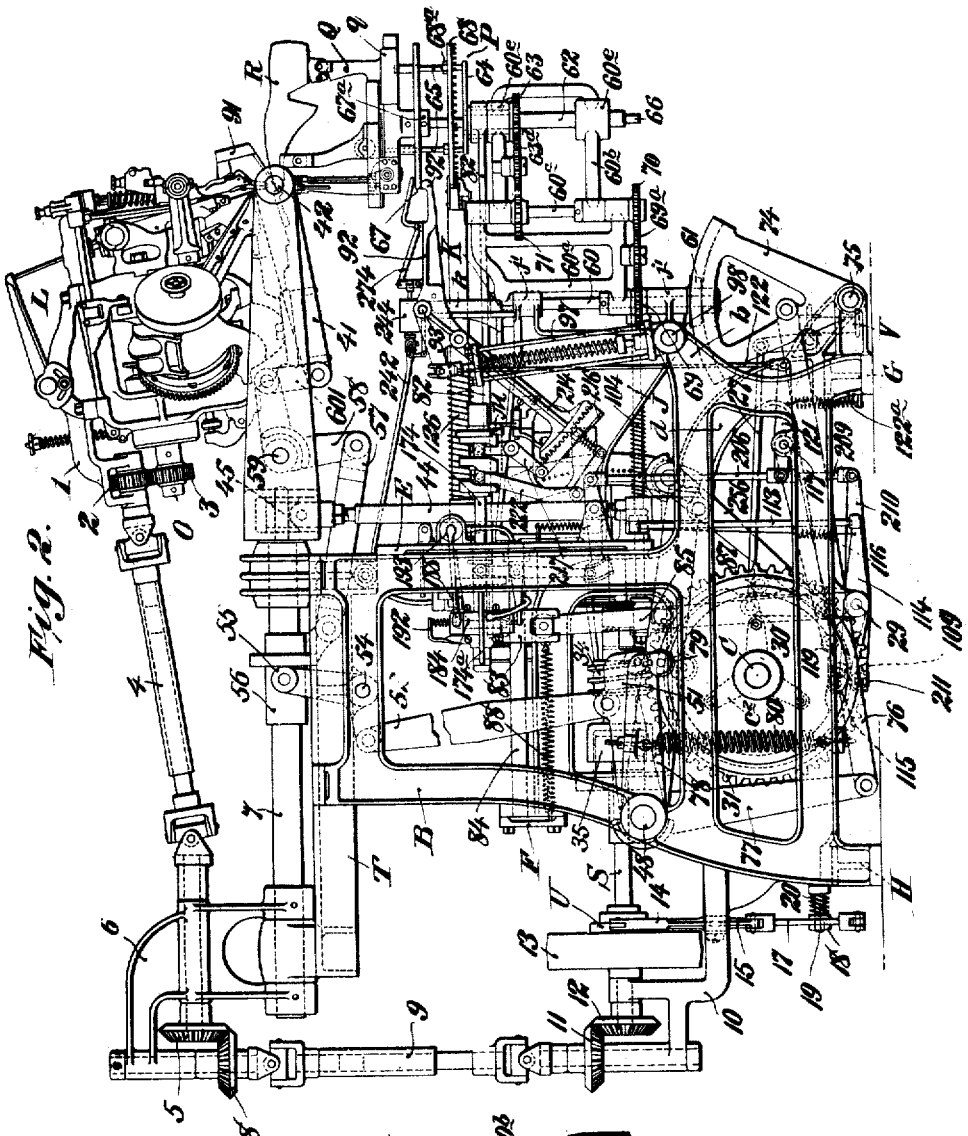
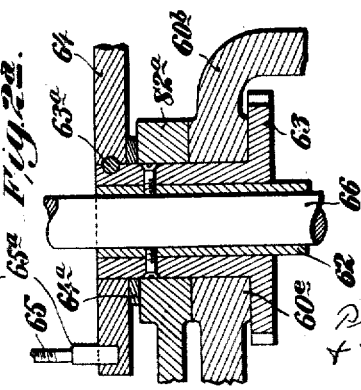

E. E. WINKLEY.
AUTOMATIC SHOE MACHINE.
APPLICATION FILED DEC. 14, 1908. RENEWED MAY 7, 1914.
1,129,373.
Patented Feb. 23, 1915.
14 SHEETS—SHEET 3.
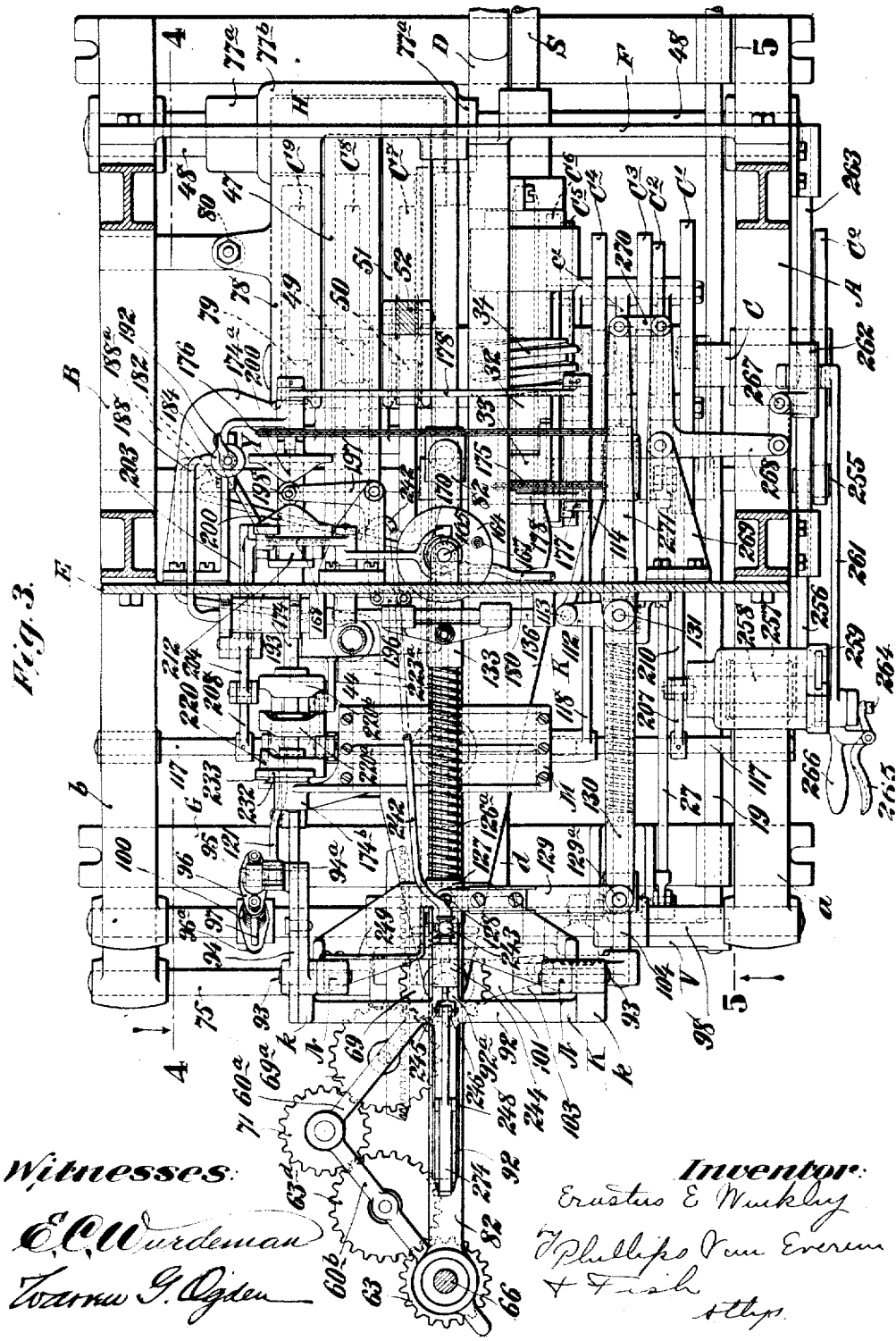
Witnesses
E. C. Wurdeman
Warren G. Ogden
Inventor
Erastus E. Winkley
Phillips Van Everen
& Fish
attys.

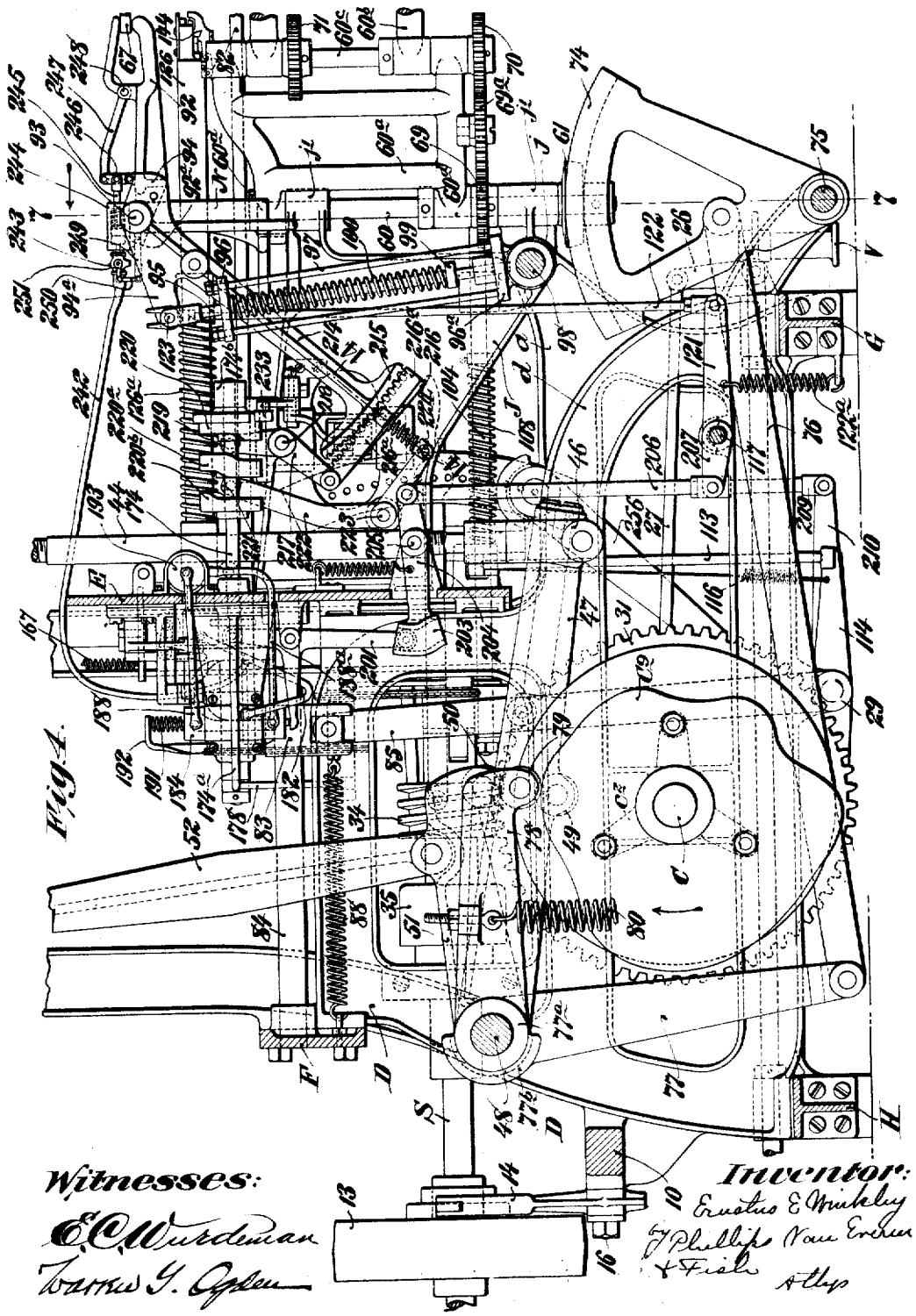

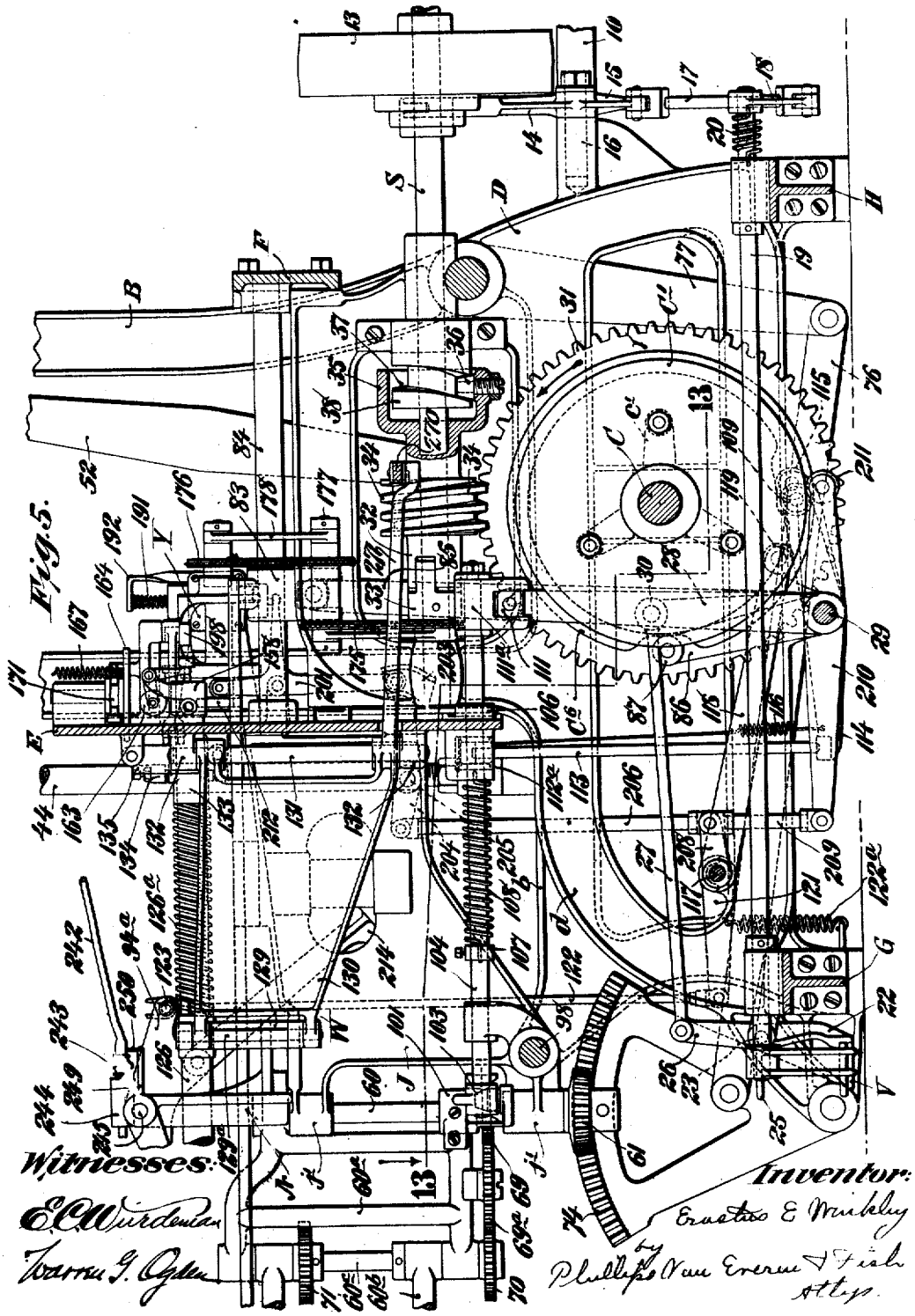

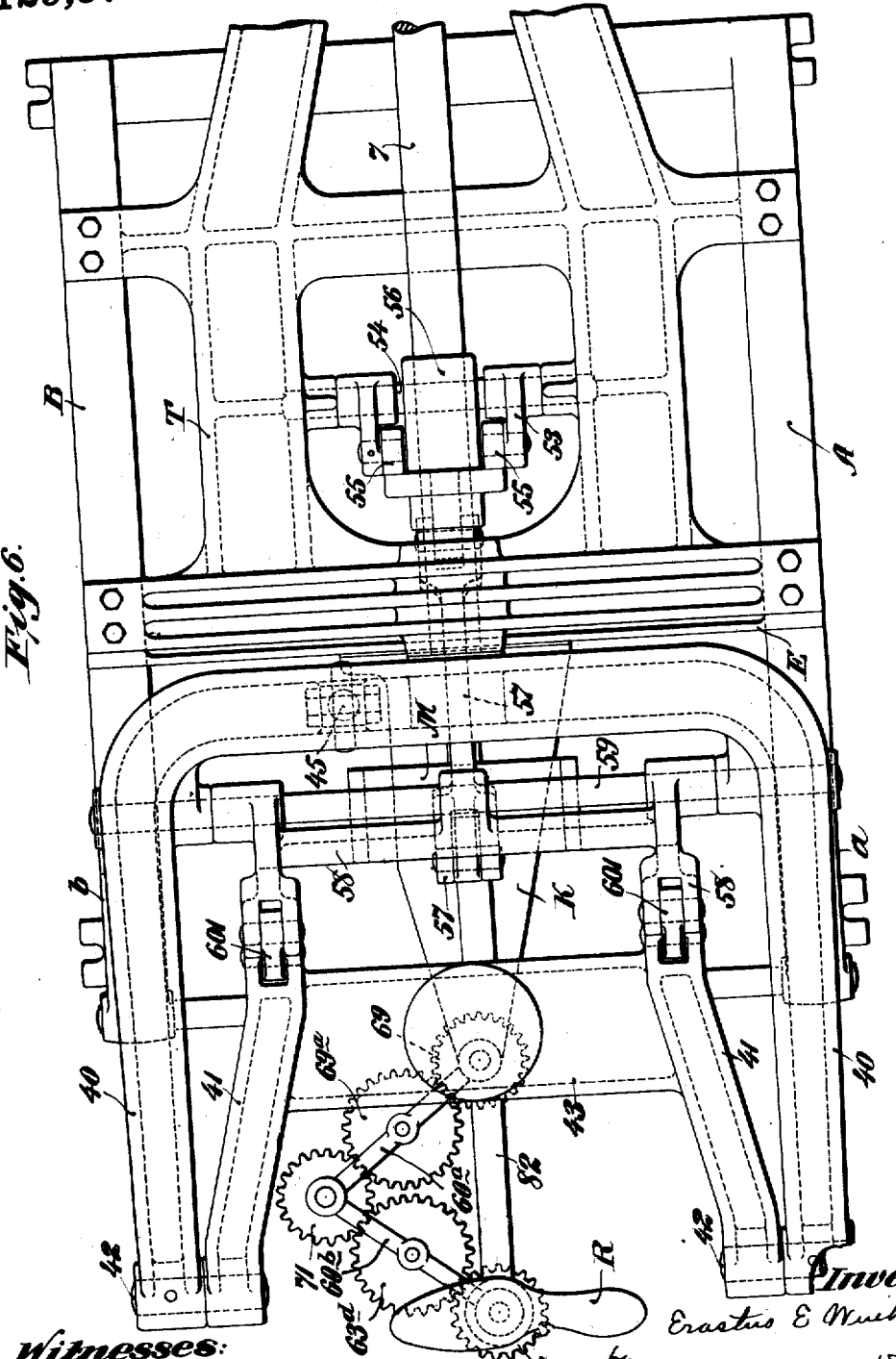

E. E. WINKLEY.
AUTOMATIC SHOE MACHINE.
APPLICATION FILED DEC. 14, 1908. RENEWED MAY 7, 1914.
1,129,373.
Patented Feb. 23, 1915.
14 SHEETS—SHEET 7.
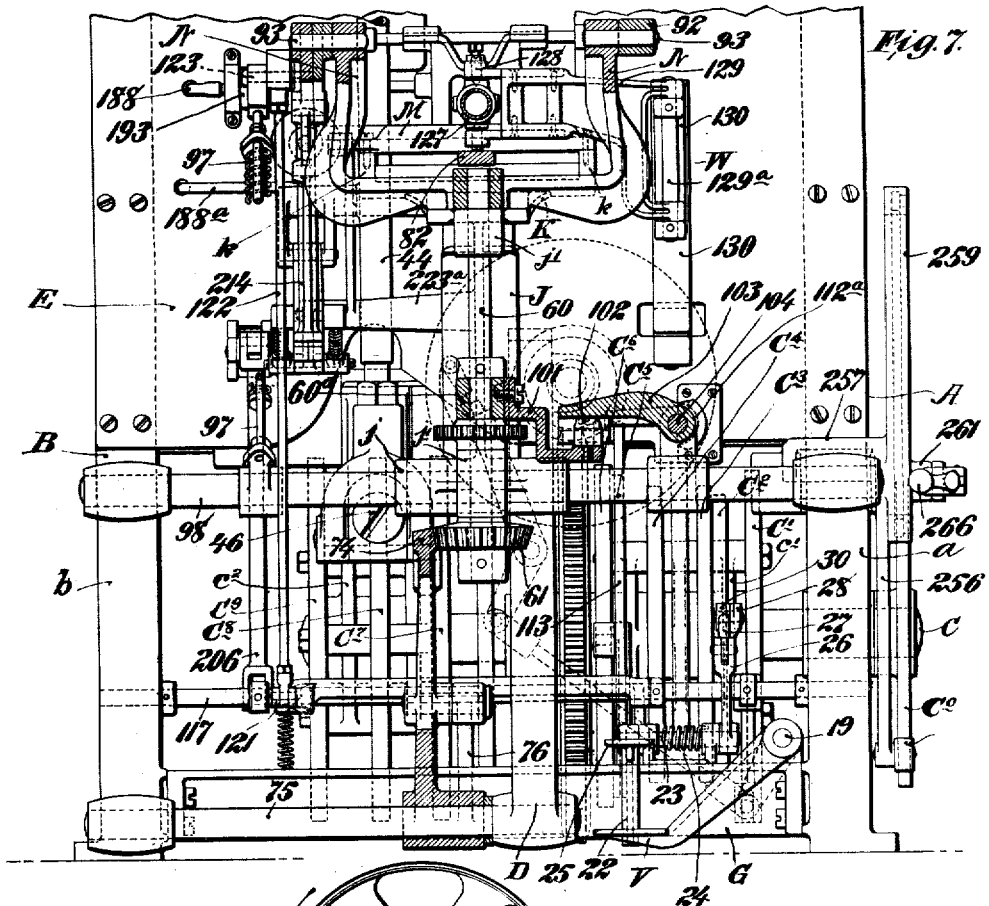
Fig. 7.
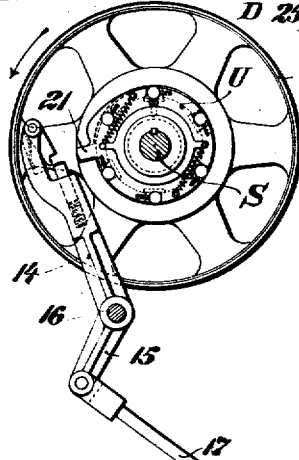
Fig. 8.
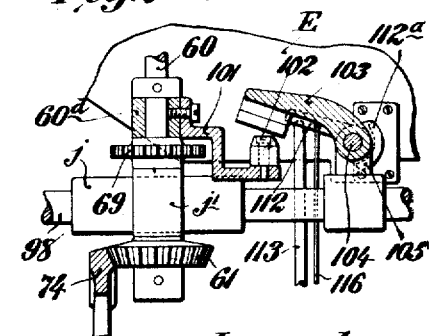
Fig. 7ᵃ.
Witnesses:
E. C. Wurdeman
Warren J. Ogden
Inventor:
Erastus E. Winkley
by
Phillips Van Everen & Fish
Attys

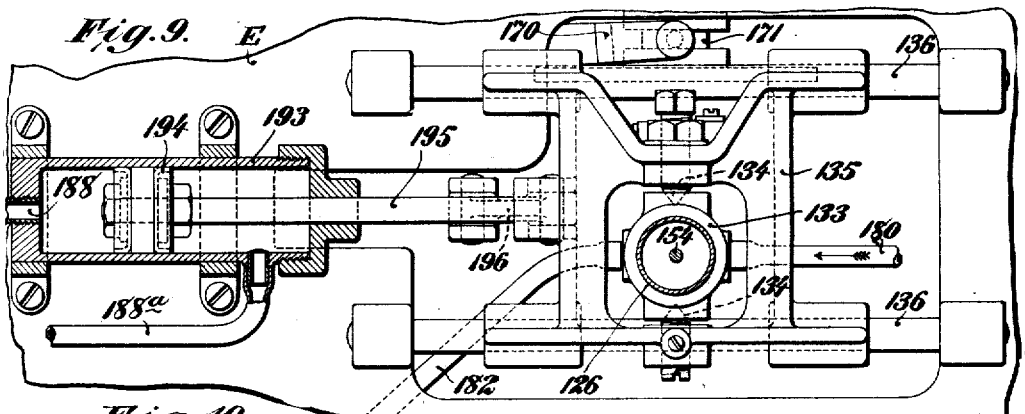
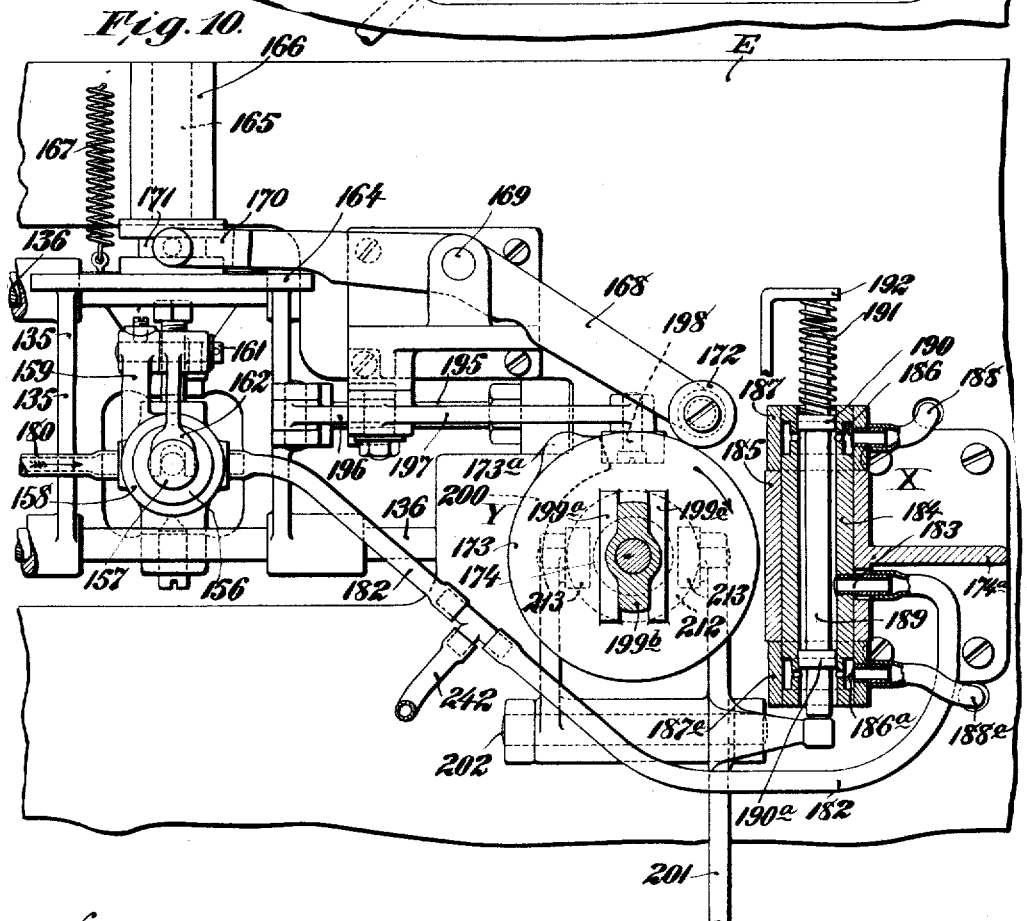

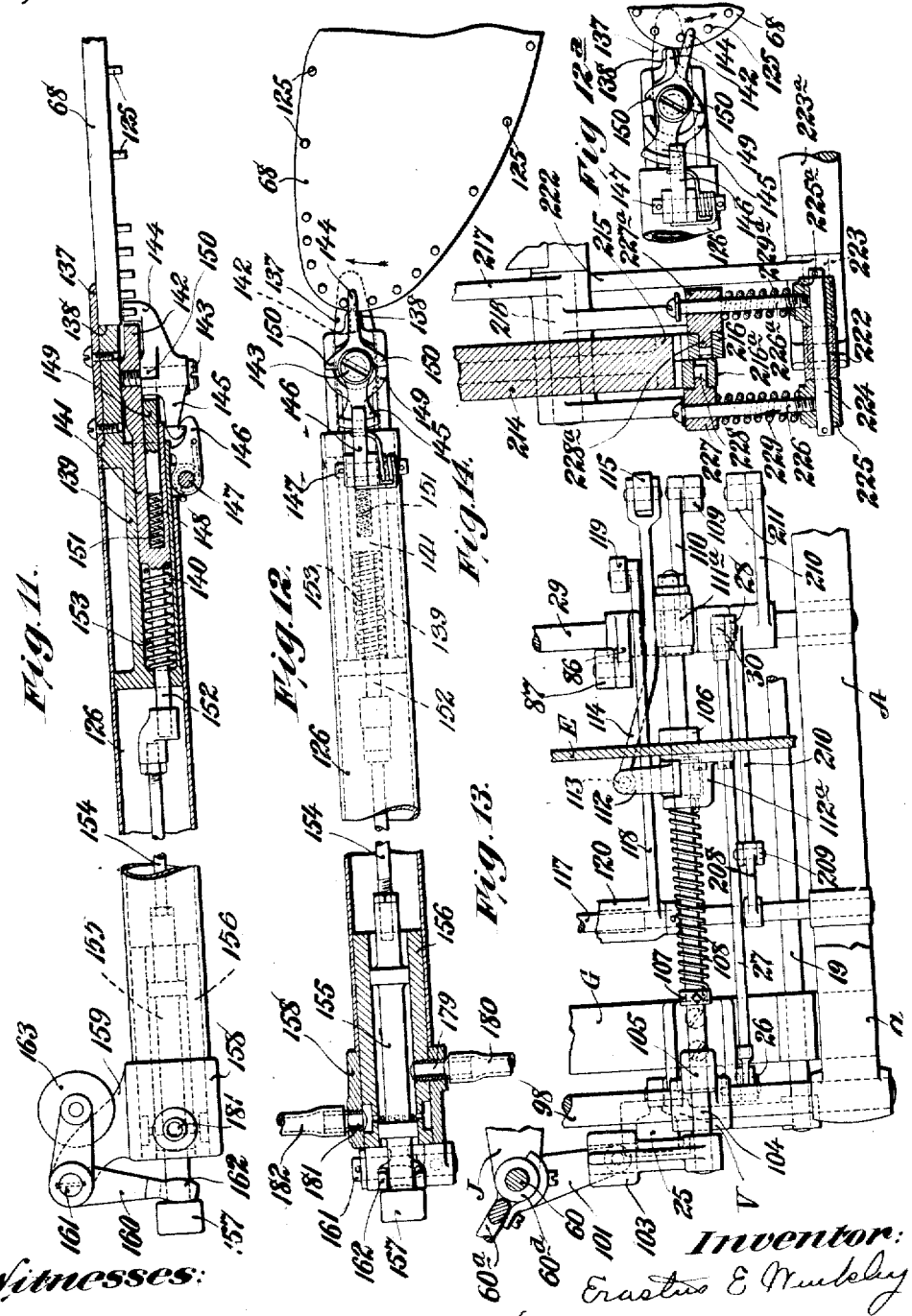

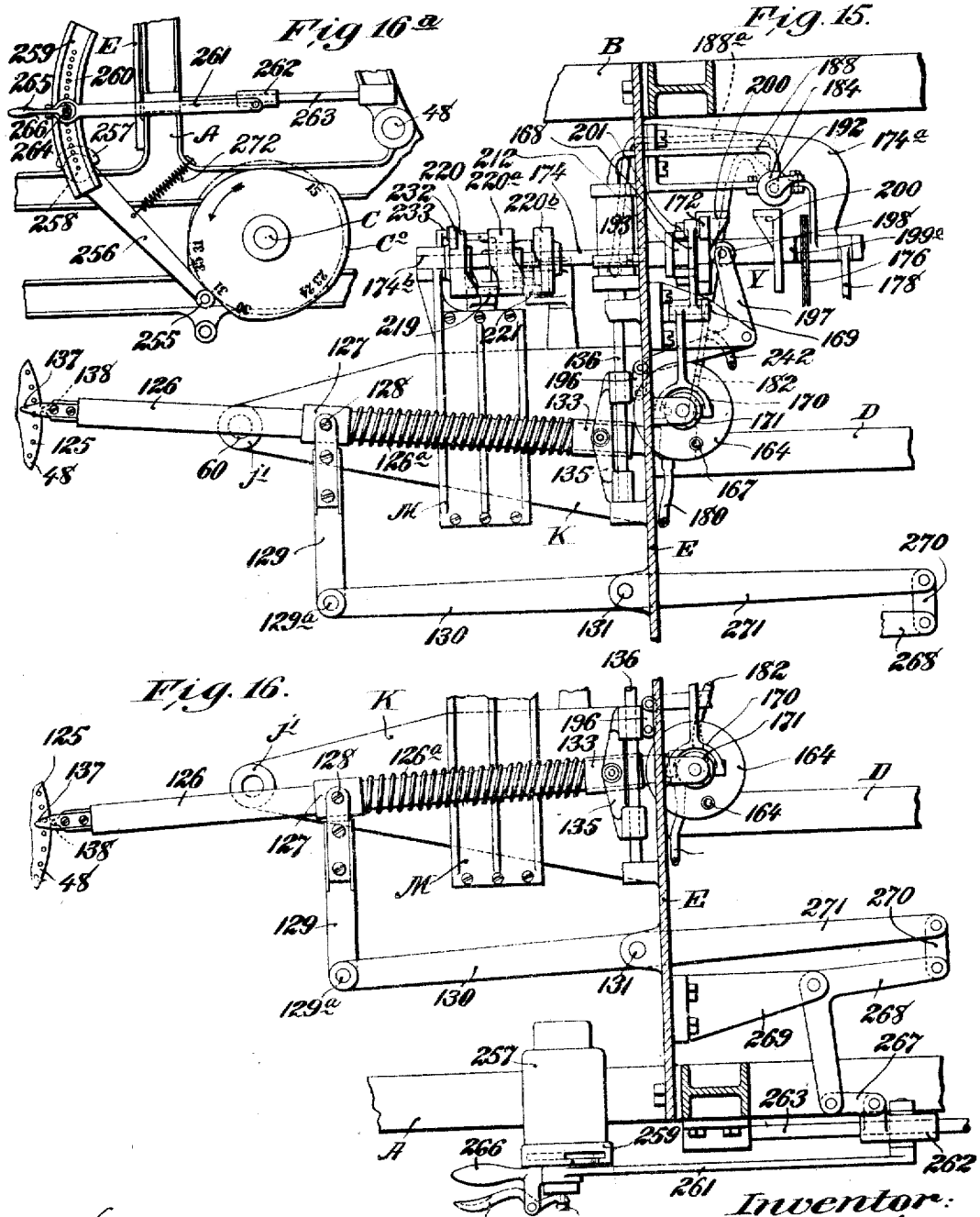

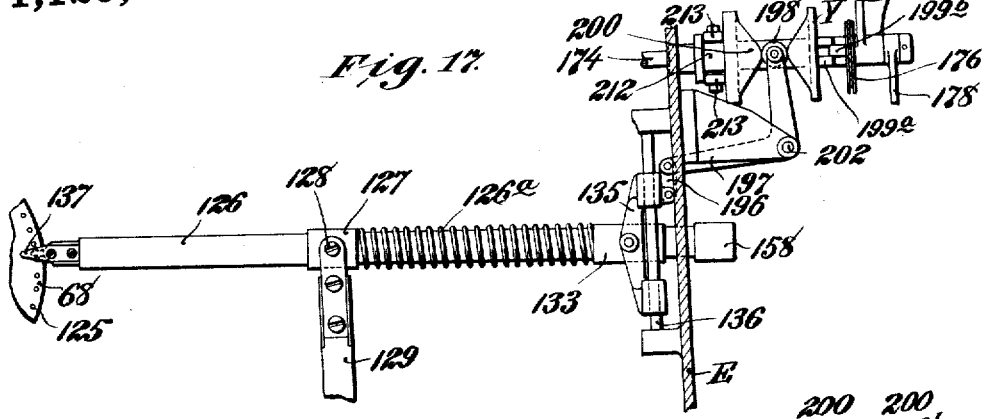
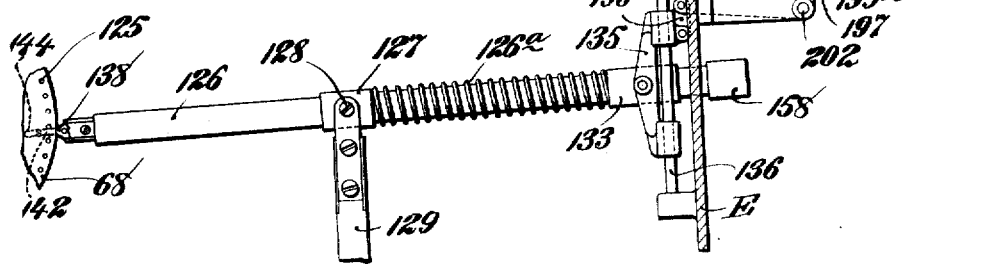
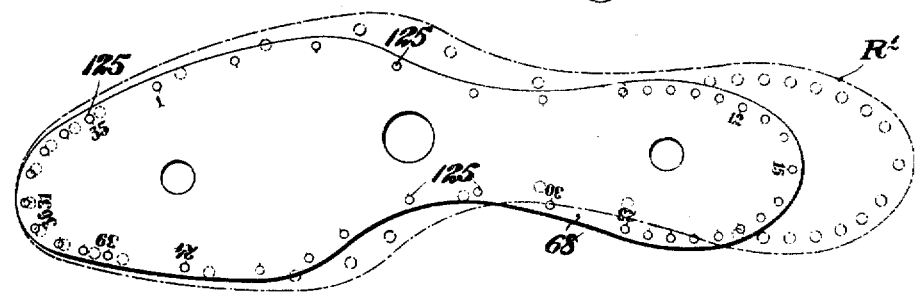

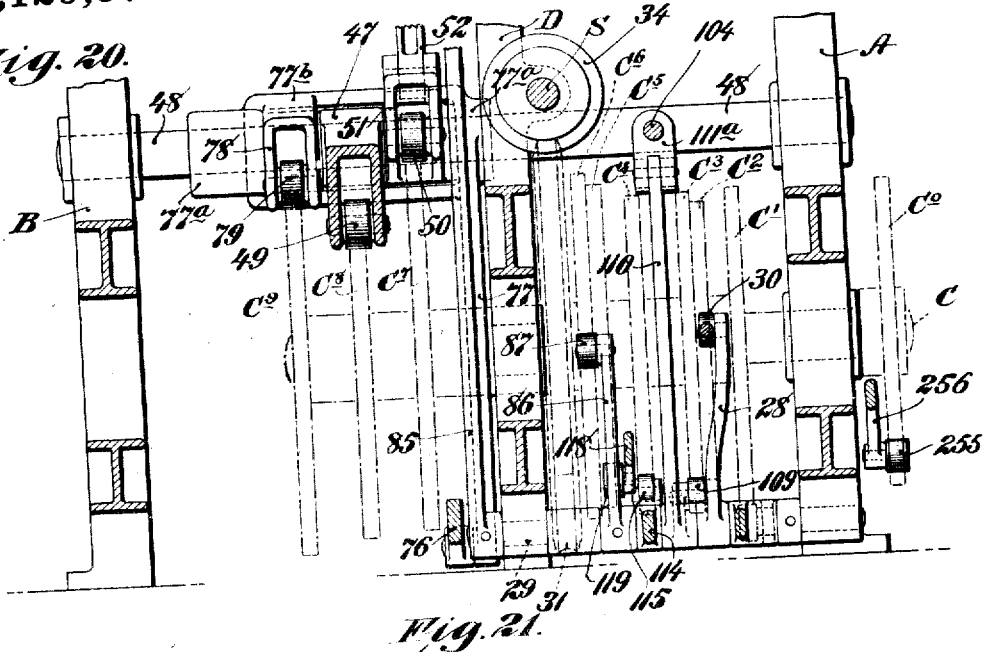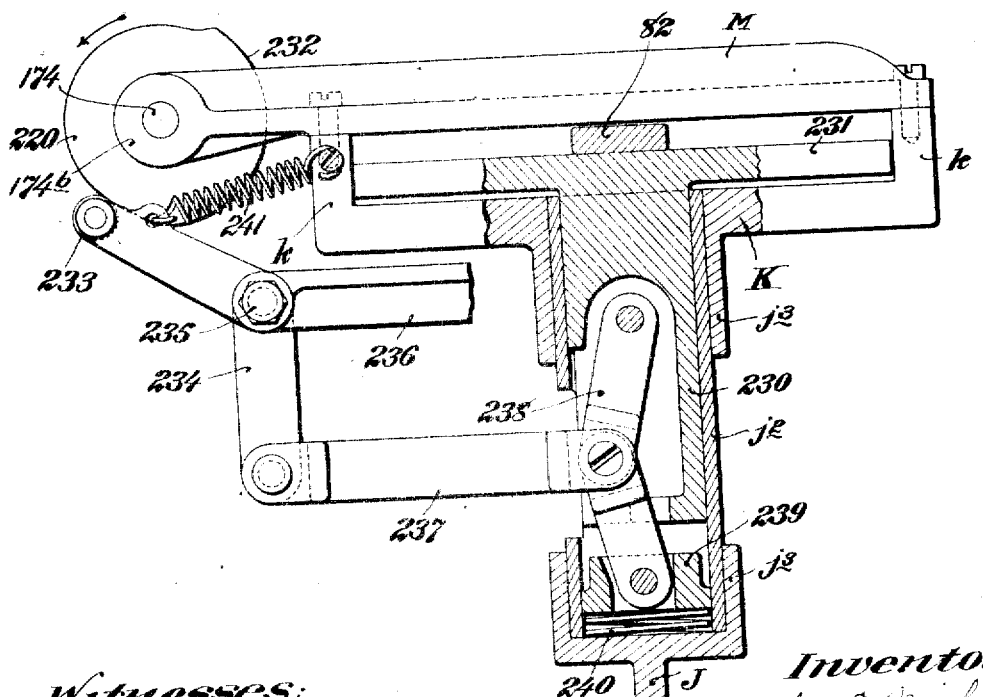

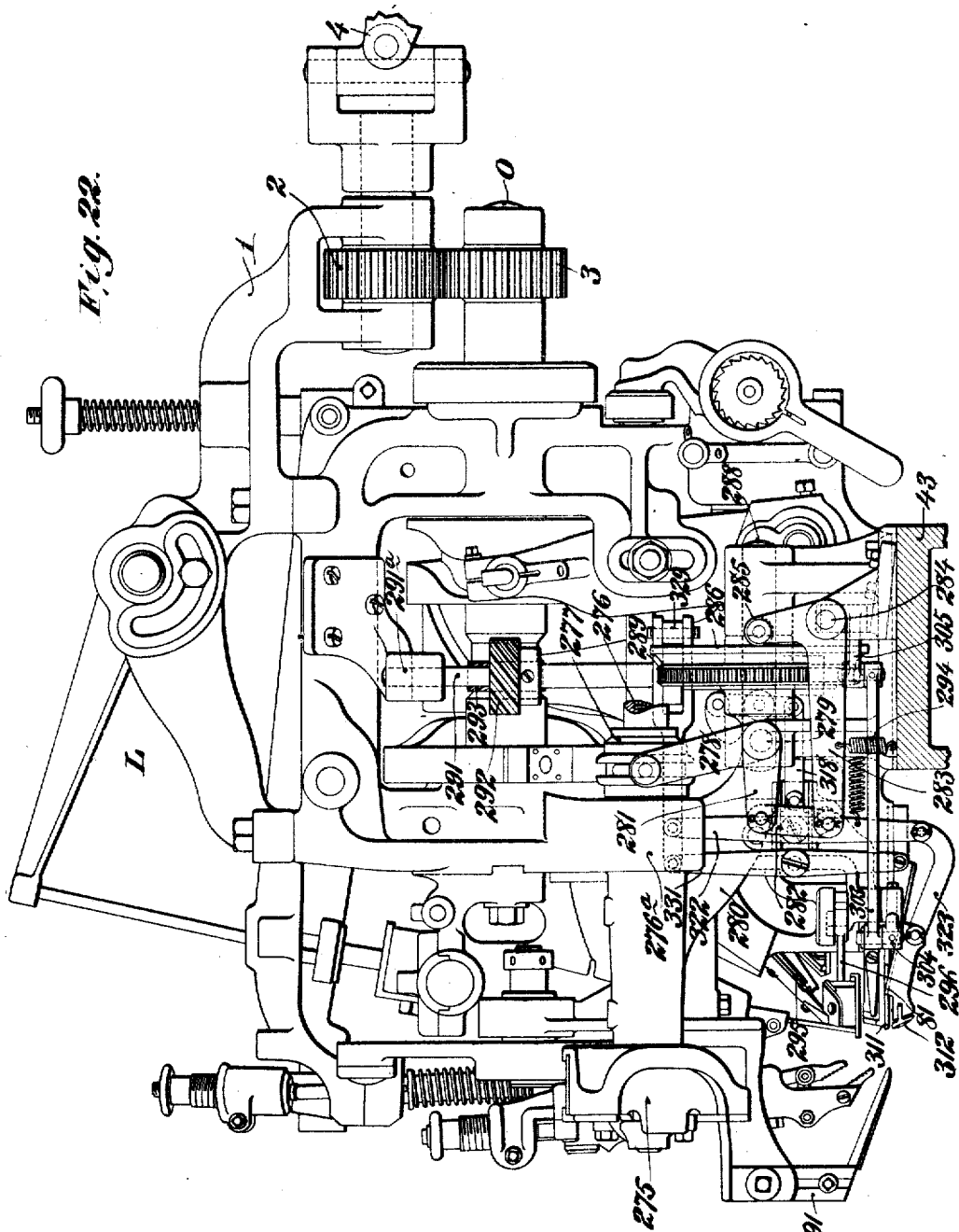

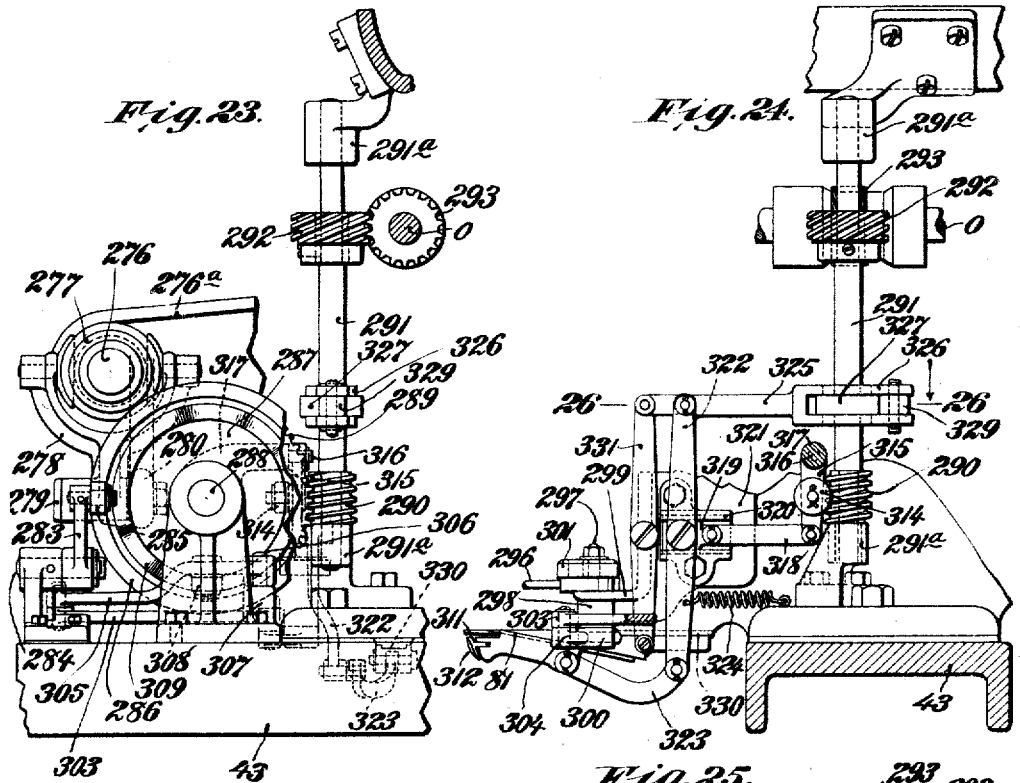
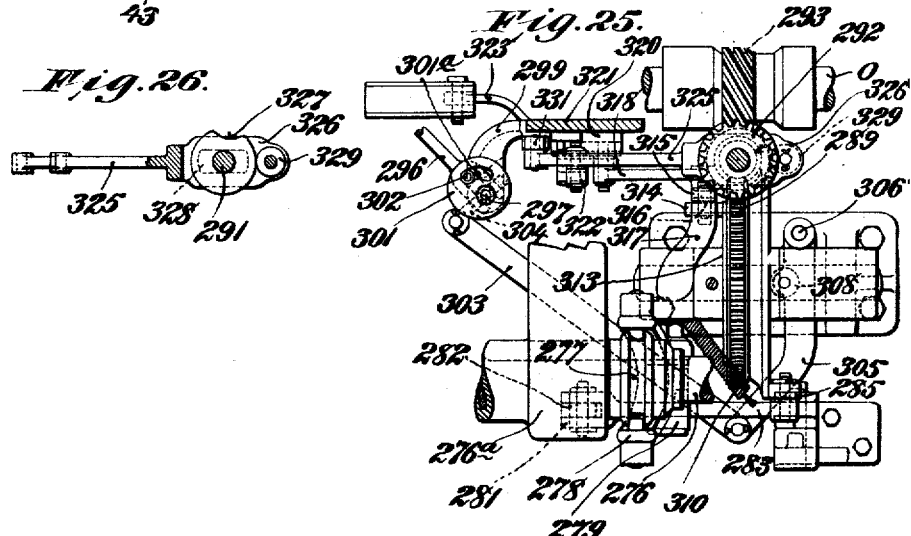

UNITED STATES PATENT OFFICE.

ERASTUS E. WINKLEY, OF LYNN, MASSACHUSETTS.

AUTOMATIC SHOE-MACHINE.

1,129,373.  Specification of Letters Patent.  Patented Feb. 23, 1915.

Application filed December 14, 1908. Serial No. 467,414. Renewed May 7, 1914. Serial No. 837,033.

*To all whom it may concern:*

Be it known that I, ERASTUS E. WINKLEY, a citizen of the United States, residing at Lynn, in the county of Essex and State of Massachusetts, have invented certain new and useful Improvements in Automatic Shoe-Machines; and I do hereby declare the following to be a full, clear, and exact description of the invention, such as will enable others skilled in the art to which it appertains to make and use the same.

This invention relates to automatic shoe machines, and more particulary to automatic lasting machines.

The invention has been illustrated as applied to that class of lasting machines wherein a single pair of pincers is provided, the point of operation of which is transferred around the shoe and the pincers, therefore, made to operate successively upon different portions of the margin of the upper, in contradistinction to that class of lasting machines provided with a plurality of pincers, or other working tools, operating to last different portions of the upper simultaneously.

The type of lasting machine to which the invention relates is known commercially as the "hand method" lasting machine. At the present time the only commercial form of the hand method lasting machine is one in which the lasting head is rigidly mounted upon a stationary support the shoe being presented to and fed past the lasting instrumentalities by the operator. The angular position of the shoe during the feeding movement and the maintenance of the working point in the proper plane relative to the pincers is entirely under control of and at the will of the operator.

As is well known to those skilled in the art, to obtain the best results the sides of the shoe should be lasted before its toe is lasted and, generally, the outside of the shoe should be lasted before the inside is lasted. Furthermore it is desirable, in McKay work, to last the toe by progressing from the center outwardly at each side, and in all work to last the sides by progressing from the toe toward the heel. This is the manner in which the best operators last shoes on the present commercial hand method machines, the shoes being fed by hand, and, at the same time, being tipped by the operator about substantially the working point as a center so as to present the insole, adjacent the portion of the upper being stretched, substantially at right angles to the line of the updraw movement of the pincers, thereby maintaining the insole in the correct plane for properly receiving the lasting tacks.

With this mode of operation in view, the general object of the present invention is to produce a lasting machine, of the hand method type, in which the point of operation of the lasting instrumentalities is automatically transferred around the shoe being operated upon in a manner to last the sides of the shoe before its toe is lasted.

In welt work, for reasons well understood by those skilled in the art, it is desirable that the toe be lasted from one side to the other in one continuous operation the lasting progressing, throughout the operation, in the same direction, while in McKay work it is desirable that the opposite sides of the toe be lasted successively, the lasting of each starting at the center of the toe and progressing outwardly or toward the heel. In particular instances the succession of the operations on the remaining portions of the shoe is also varied. One feature of the invention, therefore, contemplates a construction and arrangement of the mechanism for automatically transferring the point of operation of the lasting instrumentalities around the shoe such that the sequence, in which the various portions of the shoe are lasted, may be varied.

A further feature of the invention contemplates the combination with the automatic transference around the shoe of the point of operation of the lasting instrumentalities of an automatic relative movement between the shoe and said instrumentalities, by virtue of which the insole, at the working point, is always located with respect to the movements of the pincers and fastener inserting devices in the positions in which the shoe was formerly placed when under control of the operator. These results may be, and in the preferred embodiment of the invention are, attained by mounting the shoe on a suitable jack and imparting to the jack angular and bodily movements in such direction and sequence as to provide for presentation of the side and end portions of the margin of the upper to the lasting instrumentalities in the selected sequence, and by combining with said moving jack an automatically operating step-bystep shoe feeding mechanism so controlled in its direction of shoe feeding movement as to coöperate with the angular movement of the jack and effect such a progression of the shoe past the lasting instrumentalities as to last the shoe in the manner described. The proper relation between the insole and the lasting instrumentalities at the working point is obtained by a movement of the lasting head relatively to the work, the angular movement of the work being confined, with this construction, to a single plane.

It should be understood that employment of a step-by-step work feeding mechanism is not essential, and, therefore, broadly considered, the invention comprises means for manipulating the shoe, through its angular and bodily movements, in a manner to present successive pre-selected portions of the margin of the upper to the lasting instrumentalities in such number as to completely last the shoe.

Another feature of the present invention consists in improved devices for feeding the shoe past the lasting instrumentalities, when such devices are employed, including provision for feeding the shoe in steps of varying length so that tacks may be inserted in the manner dictated by good practice. An efficient mode of securing this result consists in the provision of a shoe feeding device capable of imparting a feeding step of the greatest desired length and suitable controlling devices therefor so that the step is shortened as the ends of the shoe are lasted, where the tacks should be closely spaced, and lengthened as the sides of the shoe are lasted, where the tacks may be farther apart. The controlling devices include a pattern, preferably comprising a pin plate having its pins located in accordance with the desired location of tacks in the lasted shoe. These pins are engaged successively by the feeding-device and serve to govern the length of feeding step.

Other features of the present invention consist in automatic mechanism for operating service devices carried by the lasting head to supersede actuating mechanisms for performing similar functions heretofore under control of the operator. These mechanisms include the actuating devices for controlling the transverse, or reaching movements of the pincers, and for controlling the presentation of a thin or a broad end bearing face on the edge guide to the work. The advantages of these mechanisms in their various combinations and arrangement of parts will be obvious to those skilled in the art from a perusal of the detailed description thereof. Such mechanisms have been applied to what is known commercially as the "nigger head" but obviously they may advantageously be used in other types of hand method of lasting head. Accordingly these features of the invention are not limited, except as defined in the claims, to use in any particular type of lasting head.

In addition to these features, the invention also consists in certain novel constructions and arrangements of parts as fully set forth hereinafter, the advantage of which will be obvious to those skilled in the art from the following description.

To the accomplishment of the objects of the invention referred to and such others as may hereinafter appear, the invention comprises the features and combinations of parts hereinafter described and particularly pointed out in the claims.

The various features of the invention will be best understood from a description of its preferred embodiment which is illustrated in the accompanying drawings and in which:

Figure 1 is an elevation of the right hand side of the machine, the upper central portion being in section, and the lasting head and pincers being shown in operative position at the toe, except that the head is horizontal; Fig. 2 is an elevation of the left hand side of the machine the parts of the operating mechanisms being in similar relation as is shown in Fig. 1 but the lasting head being shown as tipped into one of the positions it assumes in the lasting operation; Fig. 2ᵃ is a detail, in section, of that portion of the work support just below the pattern plate; Fig. 3 is a plan of the parts below the line 3—3 of Fig. 1; Fig. 4 is an elevation of the left hand side of the shoe controlling mechanisms on the line 4—4 of Fig. 3; Fig. 5 is an elevation of the right hand side of the shoe controlling mechanisms on the line 5—5 of Fig. 3; Fig. 6 is a plan of the lasting-head tipping-frame and its support with said head removed, the shoe in this figure being shown in a different position than is shown in Figs. 1 and 2; Fig. 7 is a transverse section, in elevation, substantially on the line 7—7 of Fig. 4; Fig. 7ᵃ is a detail of some of the parts shown in Fig. 7 but in different relation to each other; Fig. 8 is a detail in elevation of the clutch and its actuating devices, with the face plate removed; Fig. 9 is a detail, in front elevation and partly in section, of the feed-arm-trigger tripping mechanism; Fig. 10 is a detail, in rear elevation and partly in section, of the feed, or tripping mechanism, valve and adjacent parts; Fig. 11 is a side elevation, partly in section, of the shoe feeding arm; Fig. 12 is an underside view, partly in section, of the parts shown in Fig. 11; Fig. 12ᵃ is a detail similar to Fig. 12 of the forward end of the feeding arm showing the relation of the parts just as a feeding stroke is about to commence; Fig. 13 is a plan of the mechanism at the right hand side of the machine, below the line 13—13 of Fig. 5, with the cams removed; Fig. 14 is a section, in elevation, on the line 14—14 of Fig. 4; Fig. 15 is a detail, in plan, of the feeding arm and its actuating mechanism just before moving forward on a feeding stroke to the right; Fig. 16 is a detail, in plan, of the connections for shifting the path of movement of the feeding arm to compensate for the variations in shoes of a size different from the size of the pattern, the parts being shown in position for operating on a shoe larger than the pattern; Fig. 16ᵃ is a detail of the cam and its connection for controlling the parts shown in Fig. 16; Figs. 17 and 18 are diagrammatic views of the position of the feeding arm at the end of its feeding stroke for a right and a left feed, respectively, the guard plate over the feeding trigger being broken away in Fig. 18; Fig. 19 is a diagrammatic view showing, in outline, a shoe larger than the pattern and located in working position with respect thereto; Fig. 20 is a detail, in front elevation, showing the relative location of the cam rolls to their respective cams; Fig. 21 is a detail, partly in section, of the draw rod of the means for clamping the shoe support after the angular position of the shoe at the working point has been determined; Fig. 22 is an elevation of the right hand side of the improved lasting head; Figs. 23, 24 and 25 are a rear and a side elevation, and a plan, respectively, of the automatic mechanisms for controlling the reach of the pincers and the movements of the tack block and edge guide on the lasting head; and Fig. 26 is a detail, in plan, on the line 26—26 of Fig. 24.

Referring now to the drawings and first more particularly to Figs. 1, 2, 3 and 6, the embodiment of the invention therein illustrated is shown as mounted in a supporting frame, in the construction of which there is provided a framework comprising right and left vertical side frames A and B having, respectively, forwardly projecting brackets a and b, the general outline of these side frames being shown most clearly in Figs. 1 and 2. Between the side frames is a parallel, centrally located vertical frame D which is lower than the frames A and B (see Figs. 4 and 5). The central frame has a forward bracket d which is of somewhat different shape than the forward brackets a and b of the side frames. Extending across the frames A, B and D, at their forward sides and above the brackets a, b and d, is a flat, vertical cross plate E (Figs. 1 to 5), which binds the vertical frames together. At the rear side of the frames A, B and D is a second flat, cross plate F which assists in binding these frames together. At their lower corners, or feet, the vertical frames are bound together by front and rear beams G and H. At their tops the outside frames are bound together by means of a horizontally arranged casting T, the form of which is shown most clearly in Fig. 6, which may be termed the lasting-head tipping-frame support. The casting T projects somewhat to the rear of the vertical frames of the machine so as to counterbalance the weight of the lasting head, indicated generally by L, which head is mounted on the lasting-head tipping-frame described in detail hereinafter. In its general construction, the framework of the machine is also provided with a central bracket J (see Fig. 4) which projects forwardly from the transverse plate E. This bracket is above the vertical frame D but is a little to the left of said frame, as shown in Fig. 7. The bracket J is partially supported upon a rod 98 extending between the brackets a and b, by means of a forward hub j through which the rod is passed. The frame J is provided at its top with a horizontal plate or table K, shown most clearly in Figs. 3 and 6. Above this table and on short uprights k (Fig. 7) projecting therefrom is a horizontal transverse plate M (Fig. 3), the construction being such that there is a space left between the plates K and M (see Fig. 21). At the forward end of the bracket J there is provided a pair of upwardly projecting arms N forming in effect a U-shaped head on the bracket J, as shown most clearly in Fig. 7. This is the general construction of the framework of the machine on which the working parts are mounted although the framework is also provided with a number of brackets, bearings and supports of minor importance which will be referred to hereinafter in connection with the mechanisms which they are used to support.

The lasting head L with which the illustrated machine is provided is of the consolidated hand method, or "nigger head", type, the general construction of which is fully described and illustrated in the United States patents to S. W. Ladd and R. F. McFeely, 584,744, June 15, 1897; S. W. Ladd, 597,321, Jan. 11, 1898; and J. Cavanagh, Jr., 873,018, Dec. 10, 1907. The lasting instrumentalities carried by this lasting head operate in the same manner as the corresponding lasting instrumentalities in the patents referred to and, therefore, they need not be described in detail herein as reference may be had to said patents. Certain improvements, however, have been made in the mechanisms carried by the lasting head in adapting it to the operation of the present machine, which improvements will be described in detail hereinafter.

Speaking generally of the operation of the machine, the lasting head L is provided with a continuously rotating main shaft O and the work is suitably mounted upon a movable work support indicated generally at P (Figs. 1 and 2) provided with a jack Q on which the shoe R is mounted, the shoe being moved past the lasting head by an intermittent, or step-by-step, feed motion. The jack Q is similar in its construction to the jack of my copending application, Ser. No. 449,408, filed Aug. 20, 1908, and reference may be had to such application for a detailed description thereof. The shoe is preferably mounted on its jack with the heel seat in a horizontal plane which position places the sole of the shoe in substantially a horizontal plane although its forepart slants downward and to the rear when the shoe is in the position shown in Fig. 1, its shank slants downwardly and to the right when the shoe is moved to the position shown in Fig. 6, and when the position of Fig. 6 is reversed so that its toe points to the right instead of to the left, its shank slants downwardly and to the left. Good practice dictates that the pull of the pincers be perpendicular to the insole at the point operated upon. To provide for this, the lasting head L is mounted so that it may be tipped to the right or left or to the front or rear. This permits a presentation of the shoe to the lasting instrumentalities in a proper position to suit the inclination to the horizontal of that portion of the shoe sole adjacent the particular portion of the margin of the upper being operated upon.

In order that the lasting head may have the tipping motion described imparted to it, it is mounted in a frame which has angular movement about axes at right angles to each other. Of course, as the main shaft O of the lasting head is continuously rotating the means for imparting motion with this shaft should be arranged so that the shaft may continue to rotate in whatever angular relation the lasting head may be placed. To this end the driving pulley of the lasting head shown in the patents referred to is removed and the frame is provided with a rearwardly extending bracket 1 in which is journaled a gear wheel 2 which meshes with a second gear wheel 3 carried on the rear end of the driving shaft O. To the shaft of the gear wheel 2 there is connected a universal joint carried on one end of a telescopic link 4, the other end of which is also provided with a universal joint connected to a short shaft provided at its rear end with a bevel gear 5 and journaled in a horizontal bearing in a vertically arranged bracket 6 which is pinned to a horizontal, longitudinally arranged rock shaft 7 at the center of the machine, and journaled in suitable bearings in the lasting-head tipping-frame support T. The bracket 6 is provided also with a vertical journal in which there is suitably supported a short shaft having at its lower end a bevel gear 8 adapted to mesh with the bevel gear 5. To the lower end of this vertical shaft there is connected a universal joint carried on the upper end of a telescopic link 9 having at its lower end a second universal joint connected to the upper end of a short shaft suitably mounted in a vertical journal of a bracket 10 projecting rearwardly from the central frame D. This shaft carries at its upper end a bevel gear 11 adapted to mesh with a second bevel gear 12 mounted on the main shaft S of the machine.

The main shaft S has mounted thereon toward its rear end a driving pulley 13 connected to the shaft by means of a clutch which may be of any suitable construction. A convenient type of clutch is the well known "Horton" clutch and a clutch of this type has been illustrated at U in Fig. 8. Its construction and operation are so well known that a detailed description of it is unnecessary. The clutch is provided with the usual stop arm 14 having a spring pressed bearing pin and clutch latch at its engaging end, which stop arm, in the present instance, is provided with an extension 15 at the lower side of its fulcrum 16. This extension is connected by means of a link 17 to a crank 18 at the rear end of a longitudinally arranged rock shaft 19 (Fig. 5) which is journaled in bearings at the upper sides of the beams G and H. At its forward end, the rock shaft 19 is provided with a crank having at its end a starting treadle V. The rock shaft 19 is provided at its rear end with a torsion spring 20 which is so mounted as normally to maintain the stop arm 14 in a position to be engaged by the usual projecting lug 21 (Fig. 8) on the clutch sleeve, thus maintaining the driving shaft disconnected from its driving pulley. A depression of the starting treadle V will rock the shaft 19 in a direction to overcome the force of the spring 20 and move the stop arm 14 away from the shaft S, thus throwing in the clutch and connecting the shaft to its driving pulley. The starting treadle is held in its depressed position, with the clutch thrown in, by means of a latch 22 (Figs. 5 and 7) which depends from one end of a short rock shaft 23 journaled in suitable bearings rising from the transverse frame beam G. The rock shaft 23 is encircled by a coiled torsion spring 24 which is so connected that it acts normally to force the latch 22 forwardly and thus maintain it always in a position to hold the starting treadle V depressed. The latch 22 is in the form of a bell crank the horizontal arm of which forms as a treadle 25 which on depression overcomes the force of the spring 24 and releases the starting treadle V. A release of the starting treadle permits the spring 20 to move the stop arm 14 of the clutch inward to a position again to be engaged by the lug 21 during its rotation and thus again disconnect the shaft from its driving pulley.

A cam shaft C, extending across the machine at the rear of the framework and journaled in suitable bearings in the side frame A and central frame D (see Figs. 3, 7 and 20) is driven from the main shaft S with an intermittent, or step-by-step, motion by an actuating mechanism to be described presently. This shaft has mounted thereon ten cams, to be referred to hereinafter, which have been designated, reading from right to left in Figs. 7 and 20, $C^0$, $C^1$, $C^2$, $C^3$, $C^4$, $C^5$, $C^6$, $C^7$, $C^8$, and $C^9$. These cams are bolted to spiders $c^1$ and $c^2$ which are rigidly secured on the right and left hand portions respectively of the cam shaft C (Figs. 3, 4, 5 and 7), and are formed in halves for convenience in renewing them in case of breakage or when it is desired to substitute other cams having different lay-outs.

Mechanism is provided for automatically stopping the machine after one complete rotation of the cam shaft C and the cam $C^2$ is utilized to control the operation of this mechanism. Referring now to Figs. 5, 7 and 13, the rock shaft 23, carrying the treadle latch 22, is provided with a vertically extending crank 26 the upper end of which is connected by means of a rearwardly extending push rod 27 to the upper end of a parallelly arranged crank 28 journaled on a transverse supporting rod 29 below but a little forward of the cam shaft C. The rear end 30 of the push rod 27 is rounded (Figs. 13 and 20) and this rounded end acts as a bearing block for contact with the cam $C^2$. The force exerted by the torsion spring 24 tends to keep the bearing block 30 in contact with its cam. The cam $C^2$ is provided with a single riser, which, once in each revolution, engages the bearing block on the end of the push rod and moves said rod forward which rocks the shaft 23 in a direction to move the treadle latch rearwardly and thus release the starting treadle. The treadle is immediately raised by the action of the torsion spring 20 and the stop arm of the clutch is simultaneously brought to a position to be engaged by the clutch mechanism and thus disconnect the main shaft from its driving pulley. With this construction, if the treadle V is depressed so that it is caught by its latch and the operator then removes his foot from the treadle, the machine will automatically stop after one revolution of the main shaft, but if for any reason it is found desirable to continue the operation of the machine beyond one revolution of the main shaft, this may be accomplished by the operator maintaining the treadle depressed. It will be noted that a disconnection of the main shaft S from its clutch not only stops the operation of the cam shaft C and all the operation mechanisms controlled thereby, but also stops the operation of the lasting head driving shaft O and, therefore, stops the operation of the lasting instrumentalities which are controlled by the rotation of this shaft.

Referring now to Figs. 3, 5 and 7, the cam shaft C near its central portion and just below the shaft S is provided with a worm gear 31 rigidly secured thereto and acting as a driving gear for the cam shaft. The shaft S is provided with a slidably mounted sleeve 32 above the worm gear, which sleeve is held from rotation on the shaft, while permitting a longitudinal movement, by means of a tongue and groove connection with a collar 33 pinned to the shaft, comprising longitudinally projecting tongues which enter opposed grooves in the forward end of the sleeve 32 (Fig. 5). The sleeve 32 carries a worm 34 which meshes with the teeth of the worm gear 31. The sleeve 32 is enlarged at its rear end to form a housing 35, which is provided with a suitably mounted, interiorly arranged cam roll 36. This roll engages the groove 37 of a path cam, formed in part as a helix of the same pitch as the thread of the worm 34, in the surface of a cylindrical sleeve 38 which loosely surrounds the shaft S and is held from rotation by being bolted to the central frame D (Fig. 5). Although the pitch of the helixes of the thread of the worm 34 and the cam 37 are the same, yet the helix of the worm is a right helix while the helical portion of the cam is a left helix. In the operation of this actuating mechanism between the main driving shaft and the main cam shaft, the engagement of the cam roll 36 with that portion of the cam path 37 which lies opposite the helical portion, causes a reciprocation of the sleeve 32 which carries the worm 34 longitudinally of the driving shaft. This longitudinal motion of the worm is in the direction of rotation of the worm gear 31 and, therefore, the speed of rotation of the worm gear is augmented during the continuance of the forward longitudinal movement of the worm. This forward motion of the worm, and consequent rotation of the worm gear 31 and the cam shaft C, occupies but a small portion of the angular movement of the driving shaft, which period of time is determined by the length of time required to feed the work or perform any other desired or necessary operations between the successive operations of the lasting instrumentalities. The design of the cam path is such that after the desired amount of rotation, for the purposes named, has been imparted to the cam shaft, the power of the worm to impart continued rotation to said shaft is overcome by the action of its helical portion on the sleeve 32. During the engagement of the roll with this portion of the cam; although the worm continues to rotate by reason of its connection to the collar 33, it is moved backward by the cam 37 at the same rate of speed that it would have moved the worm gear 31 forward and it, therefore, at this time has merely an idle movement between the teeth of the worm gear. During this portion of the angular rotation of the driving shaft the worm gear has no motion imparted thereto and, therefore, the cam shaft remains stationary. This construction provides for a step-by-step rotation of the cam shaft by an actuating mechanism which is constantly in operative engagement and which, at all times, acts positively to perform its office.

It is seen that the actuating mechanism described provides for an intermittent rotation of the cam shaft C having a number of movements equal to the number of teeth in the worm wheel 31. As the lasting instrumentalities perform their office during each pause in the rotation of the cam shaft, its number of movements should be equal to the number of tacks necessary to properly last the largest shoe. In actual practice this figure will not exceed sixty and, therefore, the worm wheel has been provided with sixty teeth. The manner in which the extra movements of the cam shaft are utilized, when lasting a shoe requiring less than sixty tacks, will be explained hereinafter in connection with the description of the shoe positioning and feeding operations. The rotation of the lasting head driving shaft O is, of course, continuous being unaffected by the step-by-step driving mechanism just described. The proportioning of the gears for driving this shaft is such, however, that the lasting instrumentalities pass through sixty complete cycles of operations during one rotation of the cam shaft. Means is provided, as hereinafter explained, to prevent the delivery of tacks to the tack inserting mechanism during selected cycles of operation when operating on a shoe requiring less than sixty tacks to properly last it.

To perform the best work the pulling movement, or updraw of the pincers, should be substantially perpendicular to the insole. As the consolidated hand method lasting machines have been used heretofore, in order to maintain the plane of the insole which is adjacent the portion of the margin of the upper being operated on by the lasting instrumentalities substantially perpendicular to the line of pull of the pincers in their updraw movement, it has been the custom of the operator to tip the shoe to the desired position. This tipping movement takes place about an imaginary transverse horizontal axis when the toe is being lasted and about an imaginary longitudinal horizontal axis to the right or left, as occasion demanded, when the sides of the shank of the shoe are being lasted. In the operation of the present machine after the shoe has been jacked, although the shoe supporting mechanism, as will be described, permits a universal movement of the shoe in a horizontal plane it does not permit a tipping of the shoe out of that plane during the operation of the lasting instrumentalities. Therefore, in order to maintain the insole adjacent the portion of the margin of the upper being operated upon always perpendicular to the line of the updraw pull of the pincers, the lasting head L is given a tipping movement to the front or rear or to the right or left as may be required at different times during the lasting operation. To this end and referring more particularly to Figs. 1, 2 and 6, the forward end of the longitudinally arranged rock shaft 7 supports a large yoke 40. Within the yoke 40 is a smaller yoke 41 the arms of which are fulcrumed at their outer ends on transverse pivot pins 42 secured in, and extending inwardly from, the outer ends of the arms of the outer yoke 40. The base piece 43 of the inner yoke 41 forms the platform or support to which the lasting head L is secured. The lasting head is so mounted on its support 43 that the intersection of the axes of the rock shaft 7 and the fulcrum pins 42 passes through the working point of the lasting instrumentalities (see Figs. 1 and 2). This arrangement permits a universal tipping of the lasting head about the working point of the lasting instrumentalities as a center. The forward and backward tipping occurs about the pins 42 as a pivot, and the tipping to the right and left about the rock shaft 7 as a pivot.

In order to provide for a tipping of the lasting head to the right or left, there is connected to the base of the yoke 40 at its left hand side, and a short distance from the rock shaft 7, the upper end of a link 44 by means of a universal joint 45 (Fig. 6). This link is connected by a second universal joint 46 (Figs. 4 and 7), at its lower end, to the forward end of a longitudinally arranged lever 47 which is pivoted at its rear end on a supporting rod 48 mounted in the side frames A and B. The lever 47 is provided at a suitable point with a roll 49 which is engaged by the cam $C^8$. The cam $C^8$ is so designed that at proper times the link 44 is moved upward or permitted to drop downward by the weight of the lasting head to tip the yoke 40 and the lasting head to the right or left respectively. The forward and backward tipping of the lasting head is controlled by the cam $C^7$ which engages a cam roll 50 (Fig. 4) on the forward end of a lever 51 fulcrumed on the supporting rod 48 which lever is connected by means of a link 52 (Fig. 1) to the horizontal arm of a bell crank 53 fulcrumed on a transverse pivot pin 54 mounted in the top casting T. The vertically arranged arm of the bell crank 53 is yoked and each arm of the yoke is provided with a roll 55 (Fig. 6) adapted to bear against the rear side of a collar on a sleeve 56 loosely mounted on the rock shaft 7. The sleeve 56 is connected by means of a longitudinally arranged link 57 (Fig. 1) with the vertical arm of a compound bell crank lever 58 fulcrumed on a transverse rod 59 mounted between the arms of the outer yoke 40. The horizontal arms of the compound bell crank 58 project to a point above the inner yoke 41 and are connected by links 601 to the rear ends of the arms of said yoke. With this construction the weight of the lasting head L acts to maintain the sleeve 56 pressed rearwardly and, therefore, the cam roll 50 pressed downwardly into engagement with its cam $C^7$. The cam $C^7$ is designed so that at proper times the link 52 is permitted to move downwardly which, in turn, permits the sleeve 56 to move rearwardly under the action of the weight of the lasting head upon the compound bell crank 58. The lasting head then assumes a position such as is illustrated in Fig. 2. A forcing of the link 52 upward by the cam $C^7$ will bring the lasting head back to its normal position, such as is illustrated in Fig. 1.

Assuming that a left shoe is being lasted, as shown in Fig. 6, and that the shoe is being rotated past the lasting instrumentalities in a contra-clockwise direction and with the heel maintained in a horizontal plane, as the shank at the outside is fed past the lasting instrumentalities, the lasting head should be tipped to the right sufficiently to permit the pincers to pull the upper in a direction at right angles to the insole of this portion of the shoe. The head should be gradually returned to its normal position as the shank passes the pincers so that in lasting the horizontal heel the lasting head may be vertical, as shown in Fig. 1. As the shank at the inside is being lasted, the shoe having been rotated sufficiently to bring this portion of the shoe to the working point, the lasting head should be tipped to the left in a gradually increasing angle, in order to maintain a proper relation between the insole and the lasting pincers at this portion of the shoe. As the toe is approached at the inside the head should be given a tip to the right for the inside forepart and a backward tip as the toe is being lasted the angle of which increases until the end of the toe is reached, as shown in Fig. 2, and then decreases as the lasting progresses along the outside of the toe. The backward tip changes gradually to a tip to the left as the outside forepart is lasted, and this angle of tip decreases until at the ball, on the outside, the head has again assumed its normal vertical position, shown in Fig. 1. The cams $C^7$ and $C^8$ are so designed and timed as to provide for a tipping of the lasting head in the manner described. No forward tipping of the lasting head is necessary when the shoe is mounted with its heel seat in a horizontal plane as is contemplated by the shoe supporting means herein illustrated, but the construction described permits a forward tipping, if the mounting of the shoe should require such a tipping to take place.

As is well known to those skilled in the art, good practice in lasting dictates that the direction of overdraw movement of the pincers should always be in a line at substantial right angles to a tangent to the edge of the last at the point being operated upon. Referring now to Fig. 19 the full line may for present purposes be taken as indicating the bottom of a shoe having had inserted therein a series of lasting tacks. As illustrated, these tacks are spaced rather closely at the toe and heel and comparatively far apart at the ball and shank. With a location of tacks such as illustrated, or any location that would be selected in lasting a shoe, it is obvious that in good lasting for each point at which the lasting instrumentalities operate the angular relation between the shoe and the lasting instrumentalities should be altered. In the present machine this is accomplished through a rotation of the shoe and the movement of the shoe relative to the lasting instrumentalities is automatically controlled.

It is obvious that a rotary movement alone will not maintain the margin of the upper constantly in proper working relation to the pincers. For instance, if the toe is in proper working relation, as shown in Fig. 2, and the shoe is rotated about an axis, immovable relatively to the pincers, the margin of the upper would constantly tend to recede farther and farther away from the pincers until, when the shoe was in the position shown in Fig. 6, it would be in such position that the pincers could not possibly seize the upper. The shoe support should, therefore, be provided with an in and out movement for maintaining the margin of the upper at the working point of the pincers no matter what may be its angular relation thereto. Furthermore, in order that the shoe may be properly fed past the pincers the shoe should be mounted to permit a bodily transverse movement thereof. If the shoe support be mounted for a bodily universal movement in a horizontal plane, as well as for rotation, its movements will respond to all the requirements. The construction of the work support P to permit a universal movement of the jack Q in a horizontal plane and also a rotation of said jack about a vertical axis will now be described.

The forward end of the central bracket J of the machine frame is provided with vertical bearings j', (Figs. 2 and 4) in which a vertical shaft 60 is suitably journaled. This shaft carries at its lower end a bevel gear 61 (Fig. 7). The vertical shaft 60 sustains a toggle bracket, formed of an inner arm 60$^a$ and an outer arm 60$^b$ suitably hinged together upon a hinge pin 60$^c$, by passing through suitable hubs 60$^d$ (Fig. 4) formed at the inner end of the inner toggle bracket arm 60$^a$. The outer end of the outer toggle bracket arm 60$^b$ is also provided with vertical hubs 60$^e$ (Fig. 2) within which there is rotatably mounted a vertically arranged tube 62 (Figs. 2 and 2$^a$). The mounting of the tube 62 is shown in detail in Fig. 2$^a$ and as there shown it is rigidly secured by set screws to the hub of a gear wheel 63 which encircles the tube within the upper bracket hub 60$^e$. The gear 63 is normally held in a position just below the upper hub 60$^e$ by means of a cotter pin 63$^a$ which is forced into a hole formed by recessing the outer surface of the gear wheel hub and the inner surface of an aperture through a plate or bar 64 adapted to fit over the upper end of said hub. A washer 64$^a$ may be inserted between the plate 64 and the hub 82$^a$ of a shoe support draw bar 82 to be presently described. The plate 64 is provided with a pair of vertical pins 65 (Fig. 2) which are adapted to enter recesses in the base portion $q$ of the jack Q. The recesses for the reception of the pins 65 are located at each side of a jack spindle 66 which rests loosely within the tube 62. Before passing into the recesses formed for their reception in the base of the jack Q, the pins 65 pass through sleeves formed on a horizontally arranged plate 67 which is rigidly secured to the jack spindle 66 by means of a collar 67$^a$ pinned thereto. The plate 67 is preferably of the general form of the sole of a shoe and from its function, to be presently described, it may be termed a "jack supporting plate." With the construction described the jack and its supporting plate are both freely movable vertically on the pins 65 and within the tube 62. Furthermore, these parts may be entirely removed from the toggle bracket leaving the pins 65 clear to permit the placing of a pattern plate 68 which forms a part of the shoe feeding mechanism.

The construction and function of the pattern will be described in connection with the description of the shoe feeding mechanism. The pattern plate is held in proper vertical position by resting on shoulders 65$^a$ (Fig 2$^a$) formed on the pins 65 and held thereon by means of nuts 68$^a$ threaded on said pins. It will be noted that when the jack Q engages the pins 65 of the plate 64 it is then rigidly connected, through the cotter pin 63$^a$, with the gear wheel 63 and a rotation of this gear wheel will rotate the jack about its spindle 66 as a pivot. The spindle 66 is preferably so located relative to the jack frame that if extended vertically it would pass substantially through the ball of the shoe although it should be understood that this particular location is not essential. Rotary motion is communicated to the gear 63 from the bevel gear 61. The connection between these gears comprises a gear 69 on the vertical shaft 60 which drives a gear 70 on the lower end of the hinge pin 60$^c$ through an intermediate idle gear 69$^a$ rotatably mounted on the bracket arm 60$^a$. The hinge pin 60$^c$ is provided with a second gear 71 in position to drive the gear 63 through an intermediate idle gear 63$^d$ rotatably mounted on the toggle bracket arm 60$^b$. The gears 61, 63, 69, 70 and 71 are all of the same size (see Fig. 3) and the arrangement is such that a rotation of the gear 61 in one direction will rotate the gear 63 in the same direction.

The bevel gear 61 (Figs. 1 and 7) is rotated by meshing with a beveled segment 74 fulcrumed on a horizontal supporting rod 75 mounted in lugs projecting from the frames B and D. The frame of the segment 74 is connected by means of a rearwardly extending link 76 to the depending arm 77 (Figs. 2 and 4) of a bell crank fulcrumed by its hub 77$^a$ on the supporting rod 78 at the rear of the machine. The arm 77 of the bell crank is connected by means of a tie piece 77$^b$ with its horizontal arm 78 (Fig. 4). This arm is provided at its end with a cam roll 79 which is engaged by the cam C$^9$. The cam roll 79 is held in engagement with its cam by means of a coiled spring 80 (Fig. 2) connected at one end to the arm 78 and at its other end to the frame of the machine. The design of the cam C$^9$ is such that the segment 74 is moved at proper times forward or backward to impart an angular movement to the shoe in the desired direction.

In the present commercial hand method lasting machines, the shoe is held in contact with the edge guide, illustrated at 81 (Fig. 1$^a$), against the force exerted by the pincers in their overdraw movement, by an inward pressure placed on the shoe by the operator. In the present machine the mounting of the jack on the toggle bracket, as hereinbefore described, permits an in and out movement of the shoe. A draw bar 82 controls this in and out movement and one of its functions is to maintain the shoe in engagement with the edge guide 81. Preferably the shoe is pressed yieldingly inward so that a continuous engagement with the edge guide is automatically maintained. To this end the draw bar 82 extends rearwardly, passing beneath the top plate of the forward bracket J (see Fig. 21) for a purpose hereinafter explained. At its rear end the draw bar is provided with a sleeve 83 adapted to slide on a longitudinally arranged guide rod 84 (Fig. 4) extending between the cross frame plates E and F. The sleeve 83 is provided with a depending yoke within which fits a block on the upper end of a depending crank arm 85 which is pinned (Fig. 20) to the supporting rod 29 at the base of the frame. Also pinned to this rod is a second crank arm 86 which extends upwardly in front of the cam C⁶ and carries a cam roll 87 adapted to be engaged by said cam. The cam roll 87 is maintained in engagement with the cam by means of a coiled spring 88 (Fig. 4) connected at one end to the sleeve 83 and at its other end to the cross plate F. The supporting rod 29 is so mounted that it may have an angular movement, and, for the purposes of cam C⁶ is a rock shaft. With this construction the spring 88 will maintain the shoe constantly and yieldingly in contact with the edge guide 81 and the cam C⁶ is so designed that it will, at predetermined times, force the jack outward away from said edge guide for a purpose presently to be explained.

The lasting head is provided with the usual sole rest 91 (Figs. 1 and 2) and the jack is thrust yieldingly upward, to compensate for the unevenness of the sole surface, and thus maintain the shoe continuously in contact with the sole rest throughout the lasting operation. To this end a T-shaped supporting arm 92 (Fig. 3), adapted to bear against the under side of the jack supporting plate 67 (Figs. 1, 2 and 4), is fulcrumed by its head on transverse pivot pins 93 (Fig. 7) projecting outwardly from the heads of the vertical arms N on the central forward bracket J. This supporting arm 92 is provided at its left hand side with a plate 94 (Fig. 3) extending rearwardly beyond the left pivot pin (Fig. 4) and provided with a lug 94ª to which is pivoted the upper end of a plunger 95. This plunger passes through the upper end-plate 96 of a spring containing frame 97, which frame is fulcrumed at its lower end on the tie rod 98, before referred to, supported in the brackets $a$ and $b$. The plunger 95 is socketed in the lower end-plate 96ª of the frame 97 and is provided near its socketed end with an adjustable collar 99. The plunger is surrounded by a coiled spring 100 which is normally under compression between the upper end-plate 96 of the spring frame and the collar 99 on the plunger. With this construction there is a constant downward pressure on the plunger and a consequent constant upward pressure on the forward or working end of the supporting arm 92, which pressure is communicated, through the supporting plate 67, to the jack, thus maintaining the shoe continuously in contact with the sole rest 91 notwithstanding the unevenness of the surface of the insole.

As is well known to those skilled in the art, good practice dictates that the sides of the shoe should be lasted before the toe is lasted, and furthermore the toe should be lasted by progressing from the center of the toe outwardly at each side. While with the present machine the different portions of the margin of the upper may be lasted in any desired sequence, for purposes of illustration, the sequence indicated by the heavy faced numerals in Fig. 19 has been selected. These numerals may, for present purposes, be taken to indicate tacks and in the preferred form of the invention the cam C⁹ is designed so that tacks may be inserted in the sequence shown in Fig. 19. Assuming that a left shoe is being operated upon, such as is shown in Fig. 6, the segment 74 will first be moved by the cam about its fulcrum in such direction that the bevel gear 61 will be rotated in a direction to impart to the gear 63 and to the shoe a rotation in a contra-clockwise direction (viewing Fig. 6) while the tacks numbered 1 to 4 inclusive are being inserted. The direction of rotation is then reversed, owing to the reversal of the curvature at the outside shank, and in inserting the tacks 5 and 6 the rotation of the shoe is in a clockwise direction. For the insertion of the tacks 7 to 23 the rotation is again in a contra-clockwise direction. The shoe is then shifted bodily to the left, by means presently to be described, until it is in a position to insert the tack 24 and from this position the shoe is rotated in a clockwise direction for the insertion of the tacks 24 to 27 inclusive, after which, owing to the reversal of the curvature at the inside shank, it is rotated in a contra-clockwise direction for the insertion of the tacks 28 to 30. The shoe is then again shifted bodily to the left and simultaneously rotated in a contra-clockwise direction until it is in a position for the insertion of the tack 31. From this point the rotation in a contra-clockwise direction continues until the tack 35 has been inserted. The shoe is then rotated in a clockwise direction until it is in a position to insert the tack 36 and the rotation in this direction is then continued until the tack 39 has been inserted which completes the cycle. The shoe is then rotated in a contra-clockwise direction and again shifted bodily to the left to place the jack in proper relation to the lasting instrumentalities to start a new cycle of operations upon another shoe.

The mechanism for shifting the jack and shoe bodily to the left between the insertion of the tacks 23 and 24 and 30 and 31, and at the completion of the lasting operation, is shown most clearly in Figs. 3, 5, 7, 7ª and 13. Referring to these figures, and more particularly to Figs. 7 and 13, the lower hub 60ᵈ of the inner toggle bracket arm 60ª has secured thereto a crank arm 101 which projects from said head to the right. This crank arm carries at its free end a roll 102. It is readily seen that a movement of this crank arm 101 forward or backward will throw the toggle bracket, and with it the shoe, to the left or right, respectively. The cam roll 102 is adapted to be engaged by a grooved actuator bar 103. The groove is V-shaped in cross-section for a purpose which will presently appear. The actuator bar 103 is secured to the forward end of a longitudinally arranged rod 104 which is slidingly supported in a front bearing 105 sustained on the transverse supporting rod 98, at the front of the machine frame, and at its rear end in a collar 106 secured to the transverse frame plate E. The rod 104 is provided near its forward end with a collar 107 forming a bearing for the forward end of a coiled spring 108 (Fig. 13), the rear end of which spring is seated against a hood secured to the frame plate E, to be presently referred to. This spring tends to normally maintain the lever arm 103 pressed forward. This action of the spring is, however, overcome by the engagement of the cam C³ with a cam roll 109 on the end of the horizontal arm of a bell crank lever 110, fulcrumed on the supporting rod 29 at the base of the frame, and having the free end of its vertical arm secured, by means of a yoke and block connection 111, to a sleeve 111ª held against longitudinal movement between collars on the rod 104. The actuating mechanism for imparting longitudinal movement to the rod 104 thus permits a rotary movement independent of the longitudinal movement. The cam C³ is designed to permit the spring 108 to move the actuator bar 103, and through it the crank arm 101, forward at the times it is desired to shift the shoe to the left and the amount of forward movement is so regulated that the movement to the left is just sufficient to bring the desired portion of the shoe to the working point.

As the crank arm 101 is in constant motion during the lasting operation, owing to the constant shifting of the angular position of the shoe relative to the lasting instrumentalities and consequent movement of the toggle bracket forming the support for the jack, it would be inconvenient to maintain the actuator bar 103 constantly in engagement with the roll 102 on the crank arm. Means is, therefore, provided for releasing the engagement of the actuator bar and roll except when it is desired to shift the jack bodily across the machine. To this end the rod 104 is provided with a crank 112 (Fig. 13) which is keyed to the rod 104 and held from longitudinal movement on said rod by being mounted within a hood 112ª bolted to the front of the transverse frame plate E. This mounting of the crank 112 does not interfere with the longitudinal movement of the rod 104 and such movement may occur without altering the longitudinal position of the crank arm. The crank 112 extends parallel to the actuator bar 103 (Fig. 7ª) and is depressed by the action of the spring 108 which, in addition to being placed under compression, is also so connected to the hood 112ª and collar 107 as to act as a torsion spring. The crank 112 bears loosely upon the upper end of a rod 113 (Fig. 4), the lower end of which is seated in a socket in the forward end of a lever 114 (Figs. 4 and 13) fulcrumed centrally on the supporting rod 29 and having at its rear end a cam roll 115 which is engaged by the cam C⁴. The rod 113 is merely a strut, or stay rod, and is held in place by a light spring 116 extending between the crank 112 and lever 114. Cam C⁴ is so designed that the crank 112 is normally maintained raised against the force of the spring 108. This moves the rod 104 angularly in a direction to maintain the actuator bar 103 out of engagement with the cam roll on the toggle bracket crank arm 101. When an engagement between the actuator bar and bracket crank is desired, a depression in the cam C⁴ permits the spring 108 to rotate the rod 104 in a direction to bring the said parts into engagement. The cam C⁴, in addition to controlling the time at which the spring 108 is permitted to impart an outward thrust on the toggle bracket crank 101, is so constructed that the actuator bar 103 is placed approximately above the roll 102 at the time an engagement between these parts is desired no matter in what position the change in the angular position of the shoe relative to the lasting instrumentalities may have placed said roll. The V-shape of the groove in the actuator bar provides for an engagement of the parts even if they are not just in vertical alinement.

The bodily shifting of the shoe to the left is done very quickly and unless the shoe is removed from its working position there is liability that it will be brought in contact with some of the working parts of the lasting head causing injury thereto. To avoid such a disaster the jack is lowered and moved outwardly so as to be in a position clear of any of the working parts of the lasting head during the occurrence of these bodily movements of the shoe. The outward movement of the shoe is controlled by the cam C⁶ acting on the crank arm 85 to force the draw rod 82 forward. The downward movement of the shoe is controlled by the cam C⁵ through the following mechanism. In the lower forward part of the frame there is a transverse rock shaft 117 supported in bearings on the side frames A and B and the central frame D and on this shaft there is loosely fulcrumed a longitudinal lever 118 (Figs. 5 and 13), one arm of which extends rearwardly and has at its free end a roll 119 which is engaged by the cam C⁵. This lever arm 118 is connected by a tie piece 120, extending across the machine, to a second arm 121 (Fig. 4) which extends forwardly from the shaft 117. The lever arm 121 has pivoted thereto the lower end of a push rod 122 the upper end of which is forked and embraces the pivot pin 123, carried by the lug 94ᵃ on the jack supporting arm 92, to which the plunger carrying the jack supporting spring 100 is pivoted. The cam C⁵ is so designed that at the time the bodily shift of the shoe is to take place the push rod 122 is moved upward whereby the force exerted by the spring 100 to maintain the jack raised, is overcome, and the supporting arm 92 is moved downwardly away from the supporting plate 67. This allows the jack to drop by gravitation within the tube 62 which surrounds the jack spindle 66. The jack is aided in its downward movement by means of a clamp acting on the supporting plate 67, of which the jack supporting arm 92 forms one jaw. The construction and operation of this clamp will be described in connection with the description of the shoe feeding mechanism. The shoe is brought back into working position by a rearward movement of the draw rod 82 through the action of its spring 88 and an upward movement of the jack under the action of the jack supporting spring 100, which is again placed in action by a retraction of the push rod 122 by means of its spring 122ᵃ (Fig. 4) which is permitted to operate when the cam roll 119 enters a suitably located depression in the cam C⁵.

With the employment of the mechanisms thus far described any pre-selected portion of the margin of the upper may be presented at the working point in such a location that the lasting instrumentalities may properly perform their functions on such pre-selected portion, and thereafter other pre-selected portions may be presented in succession until the shoe is completely lasted. For example, the cam C⁹ may be designed so that at the commencement of the lasting operation the shoe is in an angular position such that the pin No. 1 of the pattern plate 68 is beneath the working point. After a tack has been inserted at this point the shoe may be removed from working position by the action of the cam C⁶ and while so removed be rotated to a position such that when returned to the working position by the draw spring 88, pin No. 2 of the pattern plate will be beneath the working point. The mounting of the jack on the toggle bracket 60ᵃ—60ᵇ makes the path of the inward movement of the shoe, after the change in its angular position has been effected, somewhat uncertain. Therefore, the actuator bar 103, controlled by the cam C³, operates in the manner described to determine the lateral position, or transverse location, of the shoe as it is drawn inward, by a bodily movement to the right or left as may be required. These operations may be repeated for each pre-selected working position of the shoe until the desired number of tacks has been inserted. This operation of the machine, while entirely practicable, is somewhat difficult of execution owing to the extreme nicety of design and timing required for the controlling cams. In the preferred form of the invention, therefore, to simplify the operation and increase the speed among other advantages, the machine is provided with a shoe feeding mechanism for feeding the shoe by a step-by-step motion past the lasting instrumentalities without a removal of the shoe from the working point. One form of feeding mechanism which has been found efficient will now be described.

The operation of the mechanism, used in the illustrated embodiment of the invention, for feeding the shoe by a step-by-step motion past the lasting instrumentalities is controlled by the pattern 68 hereinbefore referred to. The construction of the pattern 68 is shown most clearly in Figs. 2, 11, 12 and 19. As shown in those figures, and as hereinbefore described, the pattern plate is similar to a shoe sole in outline and is mounted on the shoe support P. Therefore, any movement given to the pattern plate will impart a corresponding movement to the jack Q. The pattern plate is preferably arranged horizontally and is provided at its under face with a series of pins 125 which are spaced around the perimeter of the plate in the positions in which it is desired to insert tacks through the upper of the shoe being lasted. As shown in Fig. 19, the pins are spaced rather closely together at the toe and heel, as a relatively greater number of tacks must be used in order to take care of the overlapping of the stock at the short curves at these points, and they are spaced comparatively far apart at the sides of the shoe where the curvature renders a more even distribution of the stock possible. The shoe feeding operation contemplates an organization whereby the pins 125 of the pattern plate are engaged successively in the order shown in Fig. 19, the shoe being fed in successive steps equal in length to the distance between the consecutively numbered pins. With this arrangement it is obvious that the shoe feeding mechanism must be designed to permit a feed in steps of varying length. The direct means for engaging the pattern plate, and moving it and the shoe step-by-step, comprises a tubular feeding arm 126 (Figs. 3, 11 and 12) having secured thereto about midway of its length a sleeve 127 (Fig. 7) which is provided with top and bottom sockets for the reception of vertically arranged cone bearings 128. These cone bearings are suitably mounted at the end of the outer arm 129 of a toggle bracket W which is fulcrumed by its inner arm 130 (Figs. 3 and 5) on a vertical pivot pin 131 sustained in suitable bearings 132 on the forward frame plate E. The purpose of the fulcruming of the shoe feeding arm 126 in the toggle bracket W will be explained later in connection with a description of the mechanism for adapting the shoe feeding mechanism to shoes which are either larger or smaller than the pattern plate. The rear end of the tubular arm 126 slides loosely through a sleeve 133 (Figs. 3 and 9) which is provided with top and bottom sockets for the reception of vertically arranged cone bearings 134 carried at the top and bottom of a frame 135 mounted to slide across the machine on horizontal guide rods 136 suitably mounted on the front of the transverse frame plate E. The frame plate E is cut away adjacent the guide rods (see Figs. 9 and 10) to permit the feeding arm to project therethrough. With this construction it is seen that a movement of the frame 135 to the right or left across the machine will move the forward end of the feeding arm 126 across the machine in a reverse direction about the cone bearing on the sleeve 127 as a fulcrum.

Referring now more particularly to Figs. 11, 12 and 12ª, the tubular feeding arm 126 is provided at its forward end with a top guide plate 137 which bears on the upper surface of the pattern 68. The edge of the pattern bears against an edge rest 138 on the feeding arm situated below the guide plate but somewhat in the rear of its forward end. The guide and plate edge rest are formed at the forward end of a casting 139 which is inserted in the open end of the tubular arm 126. The underside of the casting 139 is provided with a longitudinal bore forming a socket 140 for the reception of a circular plunger 141. The forward end of this plunger extends beneath the edge rest 138 and is formed as a feeding finger 142. Fulcrumed on a pivot pin 143 projecting from the lower face of the feeding finger is a pilot or trigger 144 so formed as to normally project in front of and in alinement with the feeding finger as shown in Fig. 11. The guide plate 137 acts as a guard plate for the trigger. The trigger 144 is provided with a rearwardly extending, hook-shaped tail 145 adapted to engage a spring-pressed trigger latch 146 having vertical movement on a traverse pivot pin 147 mounted at the lower side of the casting 139.

The plunger 141 is bored out to form a socket 148 for the reception of the shank of a Y-shaped sear 149 (Fig. 12ª) the arms of which are maintained in engagement with wings 150 on the trigger by means of a coiled spring 151 seated in the socket 148 behind the sear. The plunger 141 which carries the sear, the trigger and the feeding finger is provided with a rearwardly extending shank 152 which projects through an aperture in the rear wall of the casting 139 and this shank is surrounded by a coiled spring 153 located within the socket 140, which spring acts constantly to force the plunger 141 forwardly. With this construction it is readily seen that the feeding finger 142 is maintained in its rearward position, or out of engagement with the pins 125 of the pattern plate (see Fig. 11), by the engagement of the tail of the trigger with the trigger latch. If the trigger be turned in either direction about its fulcrum sufficiently to release its tail from engagement with the trigger latch, the plunger 141 will immediately be shot forward by the action of the spring 153 to a position where the feeding finger may engage the pins of the pattern plate. The sear 149 through its spring 151 immediately returns the trigger to a central position so that on a retraction of the plunger 141 the tail of the trigger will be in position to again engage the trigger latch 146.

The retraction of the plunger 141 which carries the feeding finger is accomplished by means of devices shown most clearly in Figs. 3, 10 and 11. As there shown, the shank 152 of the plunger is extended rearwardly through the tubular feeding arm by means of a suitable connection with a piston rod 154 which operates a throttle valve 155 seated in a valve casing 156 at the rear end of the tubular feeding arm. The function of this throttle valve will be described presently but for present purposes it may be considered merely as a part of the connecting rod 154. The rod 154 is extended beyond the throttle valve and is provided at its rear end with an enlarged head, or bearing block, 157. The rear portion of the valve casing 156 is surrounded by a sleeve 158 which is provided at its upper side, above the feeding arm, with a bracket 159 in which is fulcrumed a bell-crank lever 160 on a traverse pivot pin 161. The depending arm of this bell-crank is provided with a yoke 162 (Fig. 10) which engages the head 157 on the piston rod extension. The horizontal arm of the bell-crank is provided with a bearing roll 163 (Fig. 11) which is adapted to be engaged by the underside of a horizontally arranged disk 164 (Fig. 10) provided at its upper side with a pin 165 within a vertical guide-way formed in a bearing 166 (Figs. 3 and 10) carried on the rear side of the transverse frame plate E.

The disk 164 is normally maintained raised and out of contact with the roll 163 by means of a coiled spring 167 connected at one end to the disk and at its other end to the frame of the machine above the disk. The disk 164 may be depressed, and thus brought into contact with the roll 163, by the movement of a lever 168 (Fig. 10) fulcrumed centrally upon a horizontal pivot pin 169 extending from a bracket secured to the rear side of the frame plate E. One arm of the lever 168 is provided with a yoke 170 having rolls engaging between collars of a sleeve 171 secured to the disk pin 165 and its other arm is provided with a comparatively wide cam roll 172 adapted to be engaged by a cam riser 173ª formed on the periphery of a slidably mounted spool-shaped sleeve 173 to be described in detail later. This sleeve is carried by a horizontal, longitudinal counter-shaft 174 suitably journaled in a rear bearing at the upper end of a bracket 174ª (Figs. 3 and 4) extending from the rear face of the transverse frame plate E and a front bearing formed in said frame plate. The countershaft 174 is rotated continuously from the main shaft S and at the same speed by means of sprocket and chain connections 175 and 176 extending from the main shaft to an intermediate shaft 177 (Fig. 5) supported in suitable brackets 178, and from there to the counter-shaft. In addition to the devices heretofore described, the tubular feeding arm 126 also carries a coiled spring 126ª (Figs. 3 and 5) which encircles it and extends between the collars 127 and 133. This spring is under compression and acts to maintain the edge rest 138 of the feeding arm in contact with the edge of the pattern plate 68 by a forward movement of the feeding arm through the sleeve 133 and about the hinge pin 129ª of the toggle bracket W as a fulcrum. A further function of the spring 126ª will be explained in connection with the description of the operation of the feeding mechanism when lasting shoes which are either larger or smaller than the pattern plate.

In the embodiment of the invention illustrated in the drawings, the positioning of the feeding arm 126 preparatory to effecting a feeding stroke is controlled by pneumatic power and the mode of control illustrated in the drawings will now be described. It should be distinctly understood, however, that a control by pneumatic power is not essential as the positioning of the shoe feeding mechanism may readily be controlled by mechanical means.

Referring now more particularly to Figs. 3, 4, 9, 10 and 12, the throttle valve casing 156 is provided with an inlet port 179 from which there leads a flexible conduit 180 to an air compressor or other suitable source of air supply (not shown). The casing 156 is also provided with an outlet port 181, which also operates as an exhaust port, from which there leads a flexible conduit 182 to the inlet port 183 (Fig. 10) of a duplex feed valve, indicated generally by X, which is mounted in the bracket 174ª. The valve casing 184 of the feed valve X is tubular and is held in a vertical recess in the bracket 174ª by means of a removable plate 185. The upper and lower ends of the valve casing project above and below the bracket and are provided respectively with exhaust ports 186 and 186ª. The projecting ends of the valve casing 184 are surrounded by collars 187 and 187ª. Leading from the collar 187 and communicating with the exhaust port 186 is a conduit 188 which passes through the transverse frame plate E to its forward side. Connected to the collar 187ª and communicating with the exhaust port 186ª is a conduit 188ª which also passes through and to the forward side of the transverse frame plate E. Within the valve casing 184 there is mounted a valve rod 189 provided with a pair of valves 190 and 190ª. The valve rod is adapted to slide easily within the tubular valve casing and is spring pressed downwardly by a suitably arranged coiled spring 191 (Fig. 10) which surrounds an extension of the valve rod and has a bearing at its lower end on the valve 190 and at its upper end against an arm 192 (Fig. 3) rising from the bracket 174ª. The conduits 188 and 188ª lead to a cylinder 193 (Fig. 9) which is supported in suitably arranged straps on the front side of the transverse frame plate E. Within the cylinder 193 there is a piston 194 on a piston rod 195, the outer end of which rod is pivoted directly to the sliding frame 135 in which the rear end of the feeding arm 126 is fulcrumed. The conduit 188 enters the cylinder 193 at the left hand side of the piston while the conduit 188ª enters the cylinder at the right hand side of the piston. With the construction just described when the throttle valve 155 is in the position shown in Fig. 12, air will be admitted from the source of supply to the conduit 182 and if the feed valve rod is in the position shown in Fig. 10 the air thus admitted to the conduit 182 will be admitted to the cylinder 193 through the feed valve port 186 and the conduit 188. This will force the piston 194 to the right, in Fig. 9, and, therefore, will move the forward end of the feed arm 126 to the left when facing the machine. If the feed valve rod is in a position with the port 186 open to the atmosphere and the port 186ª open to the interior of the valve, air will be admitted to the cylinder 193 through the feed valve port 186ª and the conduit 188ª. This will move the rear end of the feeding arm to the left (Fig. 9) which will move its forward end to the right when facing the machine. As the feeding arm is always in a position with the edge rest 138 against the edge of the pattern plate and the trigger 144 in position to engage the pins 125 (see Fig. 12), a movement of the forward end of the feeding arm, in either direction, will cause the trigger to engage a pin and be pressed to one side (see Fig. 12ª for a movement of the feeding arm to the left) thus disengaging it from the trigger latch 146 and permitting the feeding finger 142 to move forward to a position between two of the pins 125 (see dotted lines in Fig. 18). This forward movement of the feeding finger acts through the rod 154 to carry the throttle valve forward and open the port 181 to the atmosphere which permits air to escape from the conduit 182 and the cylinder 193. Thus the placing of the feeding finger in feeding position between two of the pins of the pattern plate immediately stops the movement of the feeding arm in the direction in which it was forced by the action of the piston rod 194. It will thus be seen that the pneumatic control merely positions the feeding arm properly preparatory to performing the actual feeding operation.

The feed of the shoe takes place on the return movement of the feeding arm after the feeding finger 142 has been positioned behind one of the pins 125 in the manner just described. Mechanical means are provided for imparting the return movement of the feeding arm after the positioning of its feeding finger and to this end the transverse slide 135, which supports the rear end of the feeding arm, is connected by a short link 196 (Fig. 3) to one arm of a bell crank 197 mounted on a vertical pivot pin in the bracket which supports the lever 168 (Fig. 10). The other arm of the bell crank 197 is provided with a cam roll 198 which is engaged by a centering cam Y formed on the spool-shaped sleeve 173 on the counter-shaft 174. The centering cam comprises a pair of cam surfaces 200 (best shown in Figs. 3 and 15) projecting inwardly from its ends, the space left between the cam surfaces being just sufficient for the passage of the roll 198. The shape of these cam surfaces provide flaring openings at each side and they extend for but a short angular distance around the circumference of the spool ends (see Fig. 10). With this construction, except when engaged by the cam surfaces 200 as shown in Fig. 3, the cam roll 198 is free to move longitudinally of the counter-shaft between the ends of the sleeve 173.

The timing of the rotation of the centering cam Y is such that at the time the piston 194 is being moved by pneumatic power the cam roll 198 is in the open portion of the centering cam and, therefore, is free to move in response to the transverse movement of the slide frame 135. After the compressed air has been shut off by the forward movement of the feeding finger 142, at which time the parts are in approximately the position shown in Fig. 15, the continued rotation of the centering cam causes one of the cam surfaces 200 to engage the cam roll 198 and move the bell crank lever 197 in a direction to restore the slide 135 and, therefore, the feed arm 126, to an approximately central position, as shown in Figs. 17 and 18. This return movement of the feed rod carries the shoe with it, due to the fact that the feeding finger is at this time in engagement behind one of the pins of the pattern plate. As soon as the return movement has been completed by the action of the centering cam Y, the cam riser 173ª (Fig. 10) operates upon the lever 168 to move the disk 164 downward into engagement with the roll 163 which, as before described, retracts the feed finger and moves the throttle valve to a position to again admit compressed air to the conduit 182 when the operation of the feeding arm just described is repeated. A great advantage in this mode of operation resides in the fact that it permits a feed of the shoe in steps of varying length. The stroke of the piston 194 in the cylinder 193 is made sufficiently great to take care of the longest movement it is ever desired to impart to the forward end of the feeding arm 126, for example the feeding step occurring between pattern pins Nos. 1 and 2. When the feeding arm is started on its forward stroke, preliminary to the feeding movement on the return stroke, the piston 194 will move the entire length of the cylinder unless the compressed air power is cut off before such movement is completed. The length of the space between any two consecutive pattern pins determines the length of the piston rod movement for as soon as the trigger 144 is tripped by a pin the supply of compressed air to the cylinder 193 is shut off and said cylinder is opened to the atmosphere. The purpose of spacing the pattern pins just as it is desired to insert tacks is now obvious. At the toe and heel the close spacing of the pins provides for an early cut off of the compressed air power and a consequent short stroke of the piston 194. The more open spacing at the sides permits a longer stroke of the piston and a consequent longer forward stroke of the feeding arm preliminary to the return or feeding stroke.

In Fig. 10 the valves 190 and 190ª of the feed valve X are shown in a position to permit a feed of the shoe to the right. In order to change the location of the feed valves so that the feed of the shoe to the left may be obtained the lower end of the valve stem 180 is borne upon by the horizontal arm of bell-crank 201 (Figs. 1 and 10) which is secured to a transverse pivot pin 202 suitably journaled in bearings extending from the rear side of the transverse frame plate E. The vertical arm of the bell-crank 201 is provided at its lower end with a cam roll adapted to be engaged by a cam shoe 203 on the rear end of a lever 204 secured to a pivot pin 205 journaled in bearings extending from the front side of the transverse frame plate E (Figs. 3 and 4). The forward end of the lever 204 is connected by a link 206 to a crank 207 at the left hand side of the machine secured to the rock shaft 117. This rock shaft has secured to it a second crank 208, at the right hand side of the machine (Figs. 5 and 13), which is connected by a link 209 with the forward end of a lever 210 fulcrumed centrally on the supporting rod 29 and provided at its rear end with a cam roll 211 which is engaged by the cam C'. An inspection of Fig. 19 will show that in operating upon a left shoe a feed of the shoe to the left should be maintained while the tacks 1 to 23 inclusive are being inserted, then the feed should be to the right while the tacks 24 to 30 inclusive are inserted, then again to the left for the insertion of the tacks 31 to 35 inclusive, and finally to the right for the insertion of the tacks 36 to 39. The cam C' is designed to impart such movements to the cam shoe 203 that the valve stem 189 of the feed valve X will at proper times during the lasting operation be placed in such relation to the parts 186 and 186ª as to provide for the feed of the shoe in the desired direction. The mechanism just described provides, therefore, means for automatically changing at predetermined times the direction of the feeding movement imparted to the shoe.

As the pins 125 of the pattern plate are located in the exact positions in which it is desired to insert tacks in the insole, at each movement of the feeding arm 126 one of the pins should be placed directly beneath the driver of the lasting head. It is obvious then, that the feeding arm should not be brought to an exact central position at the end of the feeding stroke but for a feed to the right it should, at the end of its stroke, assume the angular position shown in Fig. 17, and for a feed to the left it should, at the end of its stroke, assume the angular position shown in Fig. 18. An inspection of these two figures shows that the angular position of the bell crank 197, relatively to the slide frame 135, is different in each instance. In order that the bell-crank may assume these varying positions at the end of a right and a left feed, the centering cam Y is so mounted on the counter-shaft 174 as to permit a sliding as well as a rotary movement thereon. To this end the sleeve 173 at one end is provided with a pair of parallelly arranged projecting plates 199ª (Figs. 10, 15 and 17) between which extend a pair of wings 199ᵇ formed on a collar secured to the counter-shaft adjacent the sleeve. The sleeve 173 is also provided with an extension 212 (Figs. 3 and 7) at its forward end provided with a collar and between this collar and the end of the spool there are adapted to engage rolls 213 (Fig. 10) carried by the arms of a yoke extending upwardly from the hub of the bell-crank 201 forming with the bell-crank a three-armed lever. With this construction an angular movement of the bell crank 201 not only varies the location of the feed valves but also by means of the third arm shifts the centering cam longitudinally on the counter-shaft 174 into a position to cause the feeding arm 126 to cease its movement at the proper point in accordance with whether a right or a left feed of the shoe is taking place.

While it is desirable that the jack Q be yieldingly held upward against the sole rest of the lasting head throughout the operation of feeding the shoe and positioning it for the action of the lasting instrumentalities, it is obvious that the jack should be rigidly supported at the time the tack is inserted, otherwise the shoe would merely recede before the thrust of the driver and the upper would not be secured. The machine is, therefore, provided with means for locking the jack rigidly in position just before the tack inserting devices operate. It is also desirable that at this time the shoe be given a slight upward thrust to hold it firmly in place against the sole rest and to hold the overdrawn margin of the upper closely in contact with the insole. The mechanism for performing these functions is shown most clearly in Figs. 3, 4, 7 and 14. Referring more particularly to Fig. 4, the T-shaped frame of which the jack supporting arm 92 is a part has its side plate 94 provided with a downwardly and rearwardly extending arm 214. This arm, then, has an angular movement about the pivot pins 93 with the angular movement of the jack supporting arm. The lower end of the rearwardly extending arm 214 is provided with a segmental rack 215. Adapted to mesh with the segment 215 are a pair of parallelly arranged, straight racks 216 and 216ª (Fig. 14). These racks are arranged with their teeth staggered with relation to each other so that if one rack is in a position where it will not mesh with the teeth of the segment 215, the other rack will mesh with said teeth thus increasing the latitude of engagement between the segment and racks. The racks are both fulcrumed at one end to the lower arm of a vertically arranged lever 217 in turn fulcrumed at 218 on the forward bracket J of the machine frame. The upper end of the lever 217 is provided with a cam roll 219 which is engaged by a path cam formed by the inner faces of a pair of disks 220 and 220ª which are secured to the forward portion of the counter-shaft 174 which is extended through the transverse frame plate F for this purpose and is journaled at its forward end in a bearing 174^b extending from the top plate M on the forward bracket J (see Figs. 3 and 21). The function of the cam path engaging the roll 219 will be presently explained but for present purposes it is sufficient to consider the racks 216 and 216ª as pivotally mounted at one end so that they may be moved toward and from the segment 215. Such a motion is imparted to the racks by a second cam path formed between the surfaces of the disk 220ª and a third disk 220^b on the counter-shaft 174. This cam path engages a roll 221 at the end of the upper arm of a bell-crank lever 222 fulcrumed on a pivot pin 223 supported in a journal 223ª (Figs. 3 and 7) extending from the side of the forward bracket J of the frame. The lower arm of the bell-crank 222 has mounted therein a transverse pin 224 (Fig. 14) which carries on its ends a pair of sleeves 225 and 225ª provided at their upper sides with threaded sockets in which are screwed the ends of rods 226 and 226ª, the other ends of which rods are passed through blocks 227 and 227ª and held in place in said blocks by screws passed through washers in the ends of the rods. The racks 216 and 216ª are provided with pins 228 and 228ª projecting outwardly from their sides at about their centers and the blocks 227 and 227ª are socketed at their inner sides so as to fit on these pins (see Fig. 14). This construction provides a pivotal connection at each end of the rods 226 and 226ª thus permitting a parallel link motion between the lower arm of the bell-crank 222 and the racks 216 and 216ª. The rods 226 and 226ª respectively are encircled by coiled springs 229 and 229ª which are under compression and normally maintain the racks in contact with the segment 215 on the arm 214. The path cams formed between the three disks 220, 220ª and 220^b are so designed that during the time that the shoe is being fed the upper arm of the bell-crank 222 is forced to the right, viewing Fig. 4, and the racks are retracted against the force of the springs 229 and 229ª and are thus maintained out of engagement with the segment 215. This permits the spring 100 to perform its office of maintaining the shoe sole yieldingly held against the sole rest 91 during the feeding operation. As soon as the shoe has been fed and the centering cam Y has reached the position shown in Fig. 3, the path cam formed between the disks 220ª and 220^b permits the upper end of the bell-crank 222 to move to the left, in Fig. 4, under the action of the springs 229 and 229ª which at this time operate to force the racks into engagement with the segment. Only one of the racks will engage the teeth of the segment owing to their relative location and, as shown in Figs. 4 and 14, the outside rack 216 has been placed in engagement with the teeth of the segment. This engagement locks the jack supporting arm 92 in the position in which it was placed by the spring 100 at the end of the feeding stroke of the feeding arm 126. At this time the path cam formed between the disks 220 and 220ª operates to move the lower end of the lever 217 to the right in Fig. 4, which in turn moves the racks bodily to the right and imparts an angular movement to the depending arm 214 about the pivot pin 93, which in turn moves the jack supporting arm 92 upward. This movement presses the shoe tightly against the sole rest and against the wiper on the tack carrier, which by this time has been advanced over the shoe, thus the shoe is held rigidly against downward movement and the overdrawn upper is held tightly against the wiper at the time the tack is inserted.

In order to hold the shoe rigidly in position at the working point during the operation of the pincers and tack inserting mechanism, a locking mechanism is provided which is applied to the draw rod 82 which holds the shoe against the edge guide 81 of the lasting head. This mechanism is shown most clearly in Figs. 4 and 21. Referring to these figures, as has been heretofore explained the draw rod 82 extends rearwardly beneath the top plate M supported above the table K of the forward bracket J. The forward bracket J is provided near its center with an opening (Fig. 4) having formed at its top and bottom suitable bearings $j^3$ for the reception of a cylindrical casing $j^2$ which has an opening at its left hand side (see Fig. 21). Within the casing $j^2$ is a plunger 230 having at its upper end a clamping plate 231 adapted to engage with the under side of the draw rod 82. Vertical movement is imparted to the plunger 231 by means of a riser 232 formed on the periphery of the disk 220 on the counter-shaft 174. This riser engages a cam roll 233 on the end of the upper arm of a bell-crank 234 fulcrumed at 235 on a support 236 extending from the bracket J. The lower arm of the bell crank 234 is connected by a link 237 to the knuckle of a toggle 238, the upper arm of which is pivoted to the plunger 230 and the lower arm of which is pivoted to a block 239 yieldingly sustained within the casing $j^2$ upon a coiled spring 240 seated within the lower bearing $j^3$ at the bottom of the casing. The cam roll 233 is held in engagement with the periphery of the disk 220 by means of a coiled spring 241 connected at one end to the bell crank 234 and at its other end to one of the standards $k$ for supporting the plate M.

While the cam roll is on the riser the draw rod is held tightly clamped between the plates 231 and M. When the cam roll drops off of the riser, the toggle is broken by the spring 241 and the draw rod is released. The spring 240 is designed to take up any excess throw imparted to the link 237 by the cam riser so that no more force than is necessary to tightly clamp the draw rod in position is applied. The timing of the cam riser, with relation to the path cams on the forward end of the counter-shaft 174 and to the centering cam Y, is such that as soon as the shoe has been fed and its position relative to the working point of the lasting instrumentalities thus determined, the draw rod is clamped in place and the shoe thus held firmly in the particular pre-selected position until the tack has been driven when the draw rod is released to permit a change in the angular relation of the shoe to the lasting instrumentalities and to permit the next feeding step to take place.

It is obvious that in order properly to determine the angular relation of the shoe to the lasting instrumentalities so that it may be acted on by the feeding devices, the shoe should be rotated about an axis at the working point of the lasting instrumentalities, that is, an axis at substantially the edge of the shoe bottom. If the turning axis is not at the working point but, for instance, is at the jack spindle, the rotary movement alone would act to feed the pins of the pattern plate past the lasting instrumentalities entirely independently of the action of the feeding mechanism 126. In order to provide for a turning of the shoe about an axis passing through the working point, the compressed air conduit 182 has been provided with a branch 242 (Figs. 4 and 10) which leads to a two-way cock 243 through which the air passes before admittance to a cylinder 244 (Fig. 4) sustained on a rearward extension 92ª (Fig. 3) of the jack supporting arm 92. The function of the two-way cock 243 will be presently explained. The cylinder 244 is provided with a spring pressed piston (see dotted lines Fig. 3) having the forward end of its piston rod 245 connected to the knuckle of a toggle 246. The toggle has one arm pivoted to the support 92ª and its other arm pivoted to the rear end of a lever 247 fulcrumed centrally on a pin 248 sustained by the jack supporting arm 92, the forward end of which lever operates as a jaw coöperating with the end of the supporting arm to clamp the jack supporting plate 67. The jack supporting arm 92 is so proportioned that it engages the supporting plate 67 at a point perpendicularly beneath the working point of the pincers (see Figs. 1 and 2). Therefore, when air is admitted to the cylinder 244 it operates to firmly clamp the jack supporting plate 67 at a point vertically in alinement with the working point of the pincers. As the clamping of the supporting plate is timed to occur during the operation of the bevel gear segment 74 to vary the angular relation of the shoe and lasting instrumentalities, the jack must necessarily be rotated about the clamping point as an axis, a movement of the forward arm 60ᵇ of the toggle bracket on the hinge pin 60ᶜ as a center permitting the jack to turn in this manner. A rotation of the shoe about the clamping point as a center is virtually a rotation about the working point owing to the location of the clamping point perpendicularly beneath the working point. By this mode of turning the shoe the angular relation may be changed to bring any two consecutive lasting points in the line of feed without withdrawing the point just lasted from the working point. Of course, the pressure of the clamp formed by the jack supporting arm 92 and the lever 247 on the jack supporting plate 67 should be released during the operation of the feeding arm 126, otherwise a feed of the shoe would not be permitted. This is taken care of by the spring on the piston within the cylinder 244. After the feeding finger 142 of the feeding arm has been positioned behind one of the pins 125 of the pattern plate, the supply of air is shut off in the manner heretofore explained by a forward movement of the throttle valve 155 (Fig. 12) which opens the conduit 182 to the atmosphere through the exhaust port 181 in the throttle valve casing. An opening of the conduit 182 to the atmosphere also opens the conduit 242 to the atmosphere and as the air from the conduit 242 escapes the spring on the piston in the cylinder 244 acts to force said piston rearwardly which movement breaks the toggle 246 and raises the clamping arm of the lever 247 from the jack supporting plate 67. Thus the pressure of the clamp is released just at the time that the feed of the shoe starts.

As has been heretofore explained, between the insertion of the tacks 23 and 24, 30 and 31, and 35 and 36, and after the insertion of the last tack, the shoe is withdrawn from the working point by a downward and outward movement, the downward movement being controlled by the push rod 122 and the outward movement by the draw rod 82. This removal of the shoe from the working point occurs during the time occupied in changing its angular relation between two feeding strokes, that is, during the time occupied by the feeding arm in positioning its feeding finger 142 behind one of the pins of the pattern plate. The shoe must be returned to the working point prior to the start of the return, or feeding, movement of the feeding arm. It is obvious that it is not desirable that the jack supporting plate 67 be held clamped at the time the jack is forced outwardly, as, if the clamp were in its closed position, it would act as a drag upon the jack supporting plate as it is moved away. On the other hand, it is desirable that the clamp remain in its clamping position on the jack supporting plate during the lowering of the jack, as the clamp at this time will assist in moving the jack downward. The function of the two-way cock 243 (Fig. 4) is to permit air in the cylinder 244 to exhaust to the atmosphere just before the outward movement of the jack occurs at the times mentioned. To accomplish this result, the bearing at the top of one of the brackets M of the forward frame J, as shown, the left hand bracket (see Fig. 3), is provided with an arm 249 rigidly secured thereto which is connected by a vertical link 250 (Fig. 4) with the end of a handle 251 which controls the position of the cock in its casing. It will be remembered that the cylinder 244 and the two-way cock 243 partake of the angular movement of the jack supporting arm 92 about the pivot pins 93. When the push rod 122 is operated by its cam to move the rearward extension 94 of the jack supporting arm upward and, therefore, move the arm itself downward permitting the jack to drop through the tube 62 of the jack supporting toggle bracket, the lever 247, which is then in engagement with the upper side of the jack supporting plate 67, is also moved downward and as the jack supporting plate is at this time held tightly clamped, the jack is moved downward positively. During the downward movement, however, the cock handle 251 is being rotated by the pull exerted on it from the link 250 which is held stationary by its supporting arm 249. By the time the jack has reached its lowermost position the cock handle 251 has been turned sufficiently to permit the air in the cylinder 244 to escape to the atmosphere through the two-way cock thus releasing the clamp on the jack supporting plate and permitting an easy withdrawal of the plate from the clamp as the jack is moved outward by the forward movement of the draw rod 82. It will be noted that the clamp remains open while the jack is being returned to its working position and, therefore, there is no difficulty in replacing the jack supporting plate 67 in position above its supporting arm 92. When the shoe is again raised by the spring 100, the two-way cock communication between the throttle valve 155 and cylinder 244 is automatically restored.

An important function of the clamp on the jack supporting plate is to prevent overthrow of the shoe on the feeding stroke. Although the feeding arm 126 moves through a positive distance and its movement ceases at the time it has placed the pattern pin on which it has been acting in the desired location relative to the working point, while the clamp is released there is nothing, except the frictional contact of the sole of the shoe with the sole rest 91, to prevent the shoe continuing its movement under the impulse imparted by the feeding arm. This continued and undesired movement would take place about the jack spindle as an axis for, as explained, the jack spindle is freely rotatable within the tube 62. Referring now to Fig. 10 it is seen that the angular position of the cam riser 173$^a$ is such that just at the time the feeding stroke is completed the throttle valve is moved to a position so that compressed air is admitted to the conduit 182. From thence it flows to the cylinder 244 and thus at the completion of the feeding stroke the jack is immediately firmly clamped against any further transverse movement.

The description of the operation of the shoe feeding mechanism heretofore described has been in connection with the lasting of a shoe which is the same size as the pattern plate 68. When the shoe is the same size as the pattern plate it is obvious that each pin on the pattern plate will be directly beneath its corresponding tack location on the insole. This is not true, however, when a shoe either smaller or larger than the pattern is being lasted. In Fig. 19 the dot and dash outline represents the insole of a shoe R' while the full outline represents the pattern plate 68 hereinbefore described, the shoe being several sizes larger than the pattern. In view of the fact that a jack of the particular type illustrated in my co-pending application, hereinbefore referred to, has been provided, the shoe, no matter what its size, is always positioned relative to the pattern plate by placing the tip of the toe of the shoe directly above the tip of the toe of the pattern plate so that the extreme ends of the toes are in vertical alinement with each other. The shoe and pattern plate shown in Fig. 19 have been placed in this relative location. As thus placed the tack positions on the shoe, which are indicated by the dotted line circles, are not vertically beneath their corresponding pins on the pattern plate but are somewhat to the right of their respective pins, viewing Fig. 19.

In feeding the shoe and starting with tack 1 if the pin 1 were brought by the feeding arm 126 to a position directly beneath the tack driver, the tack would be inserted in the shoe somewhat forward of the position in which it is desired to insert it. The distance that the tack is off of its proper location is represented approximately by the longitudinal distance between pin 1 and the corresponding dotted line circle on the shoe R'. An inspection of Fig. 19 shows that this variation of position increases, under the normal operation of the shoe feeding arm, until the insertion of tack 12, when it begins to decrease until the insertion of tack 15 when the variation is practically zero. This is due to the fact that while the tack location 15 is not vertically above its corresponding pin 15 of the pattern plate, it is nevertheless located substantially in the vertical plane which is perpendicular to the tangent at the perimeter of the pattern adjacent the pin 15. A normal movement of the feeding arm at this time will bring the shoe R' to a position such that the tack 15 will be properly located. From the insertion of tack 15 the variation in distance between the actual point of insertion of the tack by the normal movement of the feeding arm and its true location on the outsole, again increases until tack 23 has been inserted and then when the shoe is moved to the left for the insertion of tack 24, the variation would still continue to increase until tack 30 has been inserted. The shoe then being shifted to such position that the pin 31 on the pattern plate is brought to the working position, the proper location of the tack on the insole of the shoe R' is again substantially in the vertical plane of the perpendicular to the tangent at the perimeter of the pattern adjacent the pin 31. Therefore, for this angular position of the shoe a normal movement of the feeding arm will place the tack 31 in its proper location in the shoe R'. The variation starts again, however, when inserting tack 32 and increases until tack 35 has been inserted. After shifting the shoe to place it in position for the insertion of tack 36 the variation is again about the same as when inserting tack 32 and increases until the final tack 39 has been inserted. It is obvious then, that the normal operation of the feeding arm 126 cannot be utilized when lasting a shoe which is larger than the pattern and the same is true with the lasting of a shoe which is smaller than the pattern, for in this case there will be a similar variation between the desired and actual positions of the tacks but in an opposite direction to that just described. To compensate for this variation of tack position, means is provided for varying the path of movement of the feeding arm, so that, when its feeding stroke is effected by the action of the centering cam Y, the pin on the pattern plate engaged by the feeding finger will not be invariably moved to a position directly beneath the tack driver but will be moved to a variable position, which position will be determined by the amount of variation between the positions of the pins on the pattern plate and the true location of the tacks in the shoe.

For example, referring to Fig. 19, in inserting tack 1, pin 1 must be fed beyond a position vertically beneath the tack driver a distance approximately equal to the longitudinal distance between the correct tack location, indicated by the dotted circle and the pattern pin 1. A movement of the pattern plate pin 1 to this position will bring the correct tack location on the shoe R' beneath the tack driver and, therefore, the tack will be properly inserted. This may be accomplished by maintaining the length of feeding step the same but varying its path of movement. The purpose of mounting the feeding arm on the movable fulcrum formed by the cone bearings 125 at the end of the toggle bracket W is to provide for a variation in the path of feed of the feeding arm. It is obvious that by varying the transverse location of the fulcrum of the feeding arm, although the length of the feeding step is not varied, the transverse location of its path is varied.

The further function of the spring 126ᵃ which encircles the feeding arm, in addition to the function of maintaining the edge rest 138ᵃ in contact with the edge of the pattern will now be clear. Referring still to Fig. 19, it is seen that when lasting a shoe of a different size than the pattern the pattern pins are not only out of transverse alinement with the true tack location but are also either in front of or at the rear of such location, owing to the engagement of the edge of the shoe with the edge guide 81. This distance is variable, being greatest at tack 15 and least at tack 31. The spring 126ᵃ permits the feeding arm to advance to a position where it can invariably find the pins of the pattern when a shoe larger than the pattern is being lasted, and it permits the pattern to force the feeding arm back of the working point when a shoe smaller than the pattern is being lasted.

The change in the transverse location of the fulcrum of the feeding arm is controlled by the following mechanism. The cam C⁰ at the right hand end of the cam shaft C (Figs. 3 and 7) is designed to control the position of said fulcrum and to give it a transverse position varying in accordance with the changing variation required, as just described, in inserting a complete series of tacks in the shoe. The cam C⁰ is shown in detail in Fig. 16ᵃ, the zero circle being indicated by a dot and dash line and the numbers on the cam representing corresponding pins on the pattern plate. It will be noted that the pins 15 and 31 are on the zero circle and, therefore, no change in the path of feed occurs when positioning these pins. This cam engages a roll 255 on the end of a depending lever 256 (Figs. 3 and 7) which is provided at its upper end with a hub 257 loose on a pivot pin 258, carried in a suitable bearing on the side frame A. The hub 257, as illustrated, above the pivot pin, is provided with a segment 259 (Figs. 1 and 16ª) which is T-slotted at one side and provided at the bottom of the slot with a series of pin holes 260, one of which pin holes is at the axis of rotation of the lever. This segment forms in effect an extension of the lever 256. Within the T-slot frame in the segment 259 is a sliding block on the forward end of a lever 261 (Figs. 3, 16 and 16ª), the rear end of which is pivoted to a sleeve 262. This pivot is at the center of curvature of the segment. The sleeve 262 is slidingly mounted upon a longitudinally arranged guide rod 263 supported in brackets extending from the side frame A. The sliding block within the slot of the segment is provided with a spring pressed locking pin 264 which is adapted to enter any one of the pin holes 260. The spring pressure acts to maintain the locking pin in engagement with a selected hole and it may be moved outwardly by depressing a hand lever 265 which is fulcrumed centrally on the lever 261 and has one end engaging beneath the head of the pin 264. After moving the locking pin outward the position of the block in the segment can be shifted by moving the lever 261 through its handle 266. A movement of the lever 261 does not alter the position of the sleeve 262 owing to the coincidence of the axis of the lever with the center of curvature of the segment. The sliding sleeve 262 is connected by a link 267 to the transverse arm of a bell-crank lever 268 fulcrumed in a bracket 269 projecting from the rear side of the transverse frame plate E and the longitudinal arm of the bell-crank lever is connected by a link 270 to a rearwardly extending arm 271 rigidly connected to the inner arm 130 of the toggle bracket W in which the feeding arm 126 is fulcrumed. The cam roll 255 is held in engagement with its cam by means of a spring 272 connected at one end to the cam lever and at its other end to the side frame A. With this construction when the sliding block in the segment 259 is in a position for its pin to engage in the hole which is at the axis of rotation of the cam lever 256, the cam lever is merely moved idly by the cam C⁰ about the pivot pin 258 as a center. This is the position of the lever 261 when the shoe and pattern are of the same size. Any movement of the segment block to either side of the fulcrum of the cam lever 256 will permit the cam lever to impart a movement to the sleeve 262 which, through the train of mechanisms described, operates to move the fulcrum 128 of the feeding arm across the machine. The amount of movement imparted to the feeding arm fulcrum increases as the slide block is moved away from the axis of the cam lever 256. With a segment such as is shown in Figs. 1 and 16ª, located above the fulcrum of the cam lever, a movement of the cam lever to the left in said figures will move the sleeve 262 rearward, which, in turn, will move the fulcrum 128 of the feeding arm across the machine from left to right, as illustrated in Fig. 16. If the segment were located below the fulcrum of the cam lever a movement to the left in Fig. 1 of the cam lever would move the sleeve 262 forward and the fulcrum of the feeding arm would be moved across the machine from right to left. With this arrangement a pattern plate may be used which is the same size as either the smallest or the largest shoe which is to be lasted on the machine and the grading or compensating mechanism just described controls the path of movement of the feeding arm so as to insert tacks in their proper location in the shoe no matter what size of shoe is being lasted. When using a pattern equal in size to the smallest shoe to be lasted, the segment 259, as shown in the drawings, is placed above the fulcrum pin 258, but when using a pattern which is the size of the largest shoe to be lasted the segment is extended below the fulcrum pin 258. Each of the pin holes in the segment 259 represents a half size of shoe so that if the shoe to be lasted is four sizes larger than the pattern the sliding block is placed in the position shown in Figs. 1 and 16ª, that is, in the ninth hole from the bottom. The design of the cam is such that when the slide block is so placed, the cam automatically takes care of the path of movement of the feeding arm and varies it in such degree that tacks are properly inserted in a shoe of this size by an engagement of the feeding arm with a pattern plate which is four sizes smaller.

Referring now to Figs. 22 to 26 inclusive, the improvements which have been applied to the lasting head L will be described. The lasting head is provided with pincer and fastener inserting mechanisms which are similar to the mechanisms described in the hand method lasting machine patents heretofore referred to. A reaching movement to the right or left of the center of the machine is imparted to the pincers through the operation of an oscillatory actuator 275 which is mounted on a rotary shaft driven from a cam on the main shaft of the machine, all as described in said patents. The movement to the right or left of the center by the pincers is controlled by the position of a sliding block mounted in said actuator and adapted to be moved to a position either above or below the axis of rotation of the actuator by a suitable train of mechanism which, in the patents referred to, is under control of the operator by means of a knee lever. In the present machine the position of the sliding block in the actuator 275 and, therefore, the direction of movement of the pincers, is controlled automatically. The actuator 275 is mounted on the forward end of the usual shaft 276 (Fig. 22) journaled in a bracket 276ª, and on this shaft there is mounted the usual sliding sleeve 277 which operates, through the mechanism described in said patents, to shift the position of the sliding block in the actuator 275. The sleeve 277 is provided with a pair of collars between which rest the bearing blocks of a yoke 278 (Fig. 23) which is fulcrumed upon a transverse pivot pin 279 in a bearing in the end of a bracket 280 which depends from the shaft bracket 276ª. The yoke 278 forms one arm of a bell-crank the other arm 281 of which is connected by a link 282 to the horizontal arm of a second bell-crank 283 fulcrumed at 284 in a bracket rising from the support 43 for the lasting head. The vertical arm of the bell-crank 283 carries a cam roll 285 which is engaged by a face cam 286 on the rear side of a cam disk 287 (Fig. 23). The cam disk is mounted on a counter-shaft 288 journaled in suitable bearings rising from the lasting head support 43 and is continuously rotated by connections to the main shaft O of the lasting head. The driving connection between the shaft O and the counter-shaft comprises a worm gear 289 on the counter-shaft which is engaged by a worm 290 (Fig. 23) on a vertical intermediate shaft 291 journaled in vertical bearings 291ª sustained by the lasting head frame. The intermediate shaft is connected to the shaft O by spiral gears 292 and 293, the latter being the spiral gear shown on the main shaft of the patents hereinbefore referred to. The cam roll 285 is maintained in contact with its cam by means of a spring 294 connected at one end to the horizontal arm of the bell-crank 283 and at its other end to the lasting head support 43. The cam 286 is so designed that at the proper time during the lasting operation, namely, when lasting the toe, the position of the block in the actuator 275 is altered so as to impart to the pincers a reach to the right or left as may be desired. During the lasting of the remainder of the shoe the actuator block is held in such position that the movement of the actuator is an idle one with respect to any movement imparted to the pincers.

As is usual in lasting machines of this type, the lasting head L is provided with a raceway 295 (Fig. 22) for supplying different sized tacks to the driver. This raceway in its construction and mounting is similar to the tack raceway shown in the patent to S. W. Ladd, No. 696,740 of April 1, 1902, which is provided with a pair of roadways for supplying long and short tacks. As is well known to those skilled in the art, long tacks are used at the toe of the shoe where the upper is more or less folded and the short tacks are used at the sides of the shoe where the upper is laid flat. Like the construction of the patent referred to, the lower end of the raceway 295 is connected by means of a link 296 (Figs. 22 and 25) to a mechanism for shifting the raceway to a position to supply either the long or the short tacks to the driver. This operating mechanism, in contradistinction to the operating mechanism shown in the patent referred to, is automatic instead of being under control of the operator. The outer end of the link 296 is forked (Fig. 25) and embraces a pin 297 which is journaled in a suitable bearing 298 (Fig. 24) sustained in a bracket 299 secured to the lasting head frame. The pin 297 rises from a block 300 at the lower side of said bearing. Above the fork of the link 296 the pin has secured thereto a fork of the link 296 provided with a slot 301ª which is cut eccentric to the pin 297. This slot is engaged by a small pin 302 (Fig. 25) which projects upwardly from the link 296. The disk 301 is mounted for a sliding motion between the under side of the disk 301 and the bearing 298. Rotary motion is imparted to the block 300 through a link 303 connected at one end to a crank arm 304 (Figs. 24 and 25) projecting from the block and at its other end to the outer end of a lever 305 fulcrumed by its inner end on a pin 306 in a bearing 307 carried on the lasting head frame 43 (Fig. 23). The lever 305 is provided with a cam roll 308 between its ends which is engaged by a face cam 309 formed on the face of the disk 287 concentric with the cam 286. The cam roll 308 is maintained in contact with its cam by means of a coiled spring 310 (Fig. 25) secured at one end to the lever 305 and at its other end to the stationary framework. The face cam 309 is so designed that at the time the toe and heel are being lasted, the lever 305 is moved by the cam in a direction to rotate the block 300 and, through the pin and slot connection 301ª, 302 to move the link 296 so as to place the roadway which supplies long tacks in a position to deliver its tacks to the tack carrier. The cam also controls the position of the raceway so that while the sides of the shoe are being lasted, the roadway which supplies short tacks is in a position to supply its tacks to the tack carrier. At the times when the jack is moved downward and outward to permit a bodily transverse shift of the shoe and after the insertion of the last tack, the raceway should be in a position so that neither of its roadways can supply tacks to the tack carrier as, if tacks were supplied at this time, they would be wasted. To this end the cam 309 is so designed that at the times mentioned a sufficient movement is imparted to the link 296 to place the raceway in a position so that neither of its roadways can supply tacks to the tack carrier. This feature is not claimed herein as it is described and claimed in a divisional application, Serial No. 661,150, filed November 18, 1911.

The edge guide 81 of the shoe is provided with the usual thin end bearing face 311 and the usual broad end bearing face 312 the portion of the edge guide having the broad end bearing face being slidingly mounted upon the portion having the thin end bearing face so that the broad face may be moved in and out relatively to the shoe, all as shown in the patents heretofore referred to. The thin end bearing face of the edge guide is used when lasting the sides of the shoe and the broad end bearing face is used when lasting the toe and heel for reasons well known to those familiar with the shoe lasting operation. Heretofore it has been customary for the operator to throw the broad end bearing face of the edge guide in and out at the desired times. In the present machine means has been provided for moving this end bearing face into and out of operative position automatically. To this end a face cam 313 has been provided on the forward side of the worm gear 289 which face cam is engaged by a cam roll 314 (Fig. 24) which is carried between the ends of a lever 315 fulcrumed by its upper end on a pivot pin 316 projecting from the end of a bracket 317 (Figs. 23 and 25) carried on one of the bearings for supporting the shaft 288. The lower end of the lever 315 is connected by a link 318 to a slide block 319 (Fig. 24) adapted to slide in a guideway 320 formed on a suitably located portion 321 of the frame of the lasting head. A lever 322 is centrally pivoted on the slide block 319 and the lower end of this lever is connected by a link 323 to the portion of the edge guide 81 having the broad end bearing face. The function of the lever 322, aside from forming a connection between the slide block and the edge guide, will be described presently. The cam roll 314 is maintained in contact with its cam 313 by means of a spring 324 (Fig. 24) connected at one end to the lower portion of the lever 322 and at its other ends to the framework. The cam 313 is so designed that it operates upon its roll in a manner to move the broad end bearing face 312 of the edge guide forward at the times when the toe and heel of the shoe are being lasted and to permit the spring 324 to withdraw said bearing face out of working position at the time the sides of the shoe are being lasted.

With the construction heretofore described of locking the shoe rigidly in position at the working point, during the time the lasting instrumentalities are operating upon it, by clamping the draw rod 82 against movement, it is obvious that the upper will be forced with some pressure against the face of the edge guide and some difficulty will therefore ensue in properly stretching the upper by the updraw movement of the pincers unless this pressure is relieved. The thin end bearing face 311 of the edge guide is always in contact with the shoe and the broad end bearing face 312 is in contact during the lasting of the heel and toe. As the pressure between the shoe and edge guide should be relieved during each updraw movement of the pincers, that is, once during each revolution of the lasting head driving shaft O, it is obvious that means should be provided which will operate to withdraw at times one of said bearing faces and at times both of said bearing faces from the shoe. The further function of the lever 322 is to provide for a withdrawal of the broad end bearing face of the edge guide from the shoe when it is in operative position. To this end the upper end of the lever 322 is pivotally connected to a slide bar 325 (Figs. 24 and 26) which is provided at its rear end with a housing 326 for receiving a cam 327 mounted on the intermediate shaft 291. The housing is slotted at its top and bottom at 328 (Fig 26) so that it may have a transverse movement relatively to the shaft 291 which passes through it. The housing carries a cam roll 329 that is engaged by the cam 327. This cam has a single depression which, at each revolution of the shaft 291, which rotates at the same speed as the lasting head driving shaft O, permits a movement of the upper end of the lever 322 to the left, in Fig. 24, which movement acts to withdraw the portion of the edge guide carrying the broad end bearing face from its operative position. The timing of the cam 327 is such that this withdrawal occurs and continues during the period of time occupied by the pincers in stretching the stock. In order that the portion of the edge guide having the thin end bearing face may also be withdrawn from the shoe, this portion of the edge guide is mounted in a dove tailed guideway 330 (see dotted lines Fig. 23) and is pivotally connected to the lower end of a lever 331 fulcrumed centrally on the portion 321 of the lasting head frame. This lever at its upper end is pivoted to the forward end of the slide bar 325. With this construction when the slide bar 325 is reciprocated by the action of cam 327, the lever 331 is moved in a similar manner as the movement described for the lever 322 and the thin end bearing face of the edge guide is withdrawn from the shoe simultaneously with the broad end bearing face. The coiled spring 324 is so mounted that it maintains the cam roll 329 in contact with its cam 327 and also performs the work of withdrawing the edge guide from the shoe. From the description just given it is seen that when the broad end bearing face of the edge guide is withdrawn from working position by the operation of the cam 313, the cam 327 operates to relieve the pressure between the shoe and edge guide by a withdrawal from working position of the thin end bearing face alone but when the broad end bearing face is in working position, as shown in Fig. 24, the cam 327 operates to relieve the pressure by withdrawing both of the end bearing faces simultaneously.

A description of the operation of the various combinations of mechanisms has been given in connection with the description of their construction and arrangement and, therefore, it will be necessary to give at this time only a brief description of a cycle of operations in lasting a shoe. For simplicity, it will be assumed that the shoe to be lasted is a left shoe of the same size as the pattern plate and that thirty-nine tacks are to be inserted in the sequence shown in Fig. 19. It will also be assumed that the worm gear 31 has sixty teeth. There are therefore, twenty-one movements of the lasting and shoe feeding instrumentalities that are idle. The manner in which these extra movements are utilized will be explained in the course of the description. The shoe is jacked by the operator with the tip of its toe vertically above the tip of the toe of the pattern plate. The jack at this time is in its downward and outward position, relative to the lasting instrumentalities where it is left after the previous lasting operation to permit the ready removal of the lasted shoe and jacking of a new shoe. The pincers are just ready to start their cycle of operations and the tack raceway is in its central location so that no tacks can be supplied to the tack carrier. The broad end bearing face of the edge guide is in its retracted, or inoperative, position. The actuator bar for controlling the side reach of the pincers is in its central, or inoperative, position. The centering cam is in the position shown in Fig. 3 maintaining the feeding arm at the end of its feeding stroke. The jack supporting plate clamp is open. The throttle valve in the feeding arm is in a position to permit the compressed air in the supply conduits to exhaust to the atmosphere. The feed valve is in such position that the initial feed of the shoe will be to the left.

After jacking the shoe the starting treadle V is depressed. The lasting pincers immediately start a cycle of operations but as the shoe is not at the working point and tacks are not supplied the pincers are ineffective to perform any work. During this time the shoe is being drawn in and then raised into its working position by the springs 88 and 100. At the completion of the previous lasting operation the shoe has been left in a proper angular position for the insertion of tack 1 and its transverse location is such that when replaced in working position the pattern edge gage 138 is engaged by the pattern at a point somewhere between the pattern pins Nos. 35 and 1. On reaching this position the clamp 92, 247 closes under pressure of the air in the conduit 242, the two-way cock 243 having been closed by the upward movement of the work support. The shoe now being in its working position, the next movement to the right of the forward end of the feeding arm 126 will trip the trigger 144 on the pattern pin No. 1 which will permit the feeding finger 142 to shoot forward into position on the right hand side of said pattern pin. This positioning of the feeding finger operates on the throttle valve 155 in a manner to cut off the supply of compressed air to the conduits 182 and 242 and to open said conduits to the atmosphere. The movement to the right of the feeding finger, therefore, immediately ceases and the jack clamp is opened. The feeding stroke of the arm 126, to the left, by means of the centering cam Y places the pattern pin No. 1 vertically beneath the location of the tack 1 and, therefore, the portion of the margin of the upper adjacent this tack location is properly placed at the working point. The feeding finger is at this time withdrawn by operation of the cam riser 173ª and compressed air is admitted to the cylinder 244 to operate the jack clamp. The cam riser 232 operates on the clamping plate 231 to lock the draw bar 82, and consequently the whole work support, against movement in a horizontal plane. The pincers then seize the upper and it is updrawn and overdrawn. During the updraw movement the thin end bearing face 311 of the edge guide 81 is withdrawn by the cam 327 to prevent friction between the guide and the upper. After the overdraw movement the path cams formed between the disks 220, 220ª and 220ᵇ operate to press the overdrawn upper tightly against the insole by a compression against the wiper carried by the lasting head and to lock the jack in this position and against downward movement while the tack is being inserted. The raceway has meanwhile been moved by the cam 309 to a position to supply the proper sized tack. By the time the tack is inserted the feeding finger has been positioned behind the pattern pin No. 2.

The operations just described necessary to the insertion of the tack 1 occupy, say, three complete revolutions of the lasting head shaft. Thus two of the revolutions have been idle or ineffective ones and are two of the twenty-one idle movements referred to. The cycle of operations described, with the exception of raising the shoe to its working position, is carried out with a continuous feed of the shoe to the left for each tack until the tack 23 has been inserted. The angular position of the shoe at the working point during this time is properly determined by the operation of the cam $C^9$ and its connections to the jack spindle 66, and of the jack supporting plate clamp 92, 247. During the lasting of the heel the raceway is moved by its cam 309 so as to supply long tacks to the tack carrier.

After inserting the tack 23, the cam $C^5$ operates on the push rod 122 to move the jack downward, the jack clamp is opened, and the cam $C^6$ moves the shoe outward from its working position. After thus removing the shoe the cam $C^4$ permits the spring 108 to place the actuator bar 103 in engagement with the roll 102 on the work support crank 101, and thereafter the cam $C^3$ permits the spring 108 to move the actuator bar forward which moves the work support and shoe bodily to the left. This movement is such, as that when the shoe is replaced in its working position by an inward movement the pattern engages its edge gage 138 at a point between the pattern pins Nos. 24 and 39. During this time the cam $C^1$ has moved the cam shoe 203 to a position to shift the valve rod 189 of the feed valve X so that the compressed air will be admitted to the conduit 188 and the feeding arm 126 will operate to impart a feed to the shoe to the right. Therefore, the next feeding finger positioning stroke of the feeding arm will place the feeding finger on the left hand side of the pin No. 24 and this pin will be placed vertically beneath the working point on the feeding stroke of the feeding arm. The positioning of the shoe for the insertion of the tack 24 occupies, say, four more of the twenty-one idle movements of the lasting instrumentalities. The feed to the right continues until the tack 30 has been inserted. The shoe is then again moved downward and outward and thereafter is carried inward by a bodily and angular movement to a position such that the pattern pin No. 31 may be engaged by the feeding finger and brought to a position vertically beneath the working point. This movement takes up, say, five more of the twenty-one idle movements referred to. The direction of feed of the shoe has again been reversed and for the insertion of the tacks 31 to 35 inclusive the feed is to the left. In lasting this portion of the shoe the cam 286 operates to impart a side reach to the pincers to the right and the cam 309 permits long tacks to be supplied to the tack carrier. After the insertion of the tack 35 the shoe is again moved downward and outward and placed by a combined movement of translation and rotation in position to enable the pattern pin 36 to be engaged by the feeding finger and brought to a position vertically beneath the working point. This movement takes up, say, four more of the twenty-one idle movements referred to. The direction of feed has again been reversed and the tacks 36 to 39 inclusive are inserted by a feed movement of the shoe to the right. In lasting this portion of the shoe long tacks are still supplied but the cam 286 has reversed the side reach of the pincers and it is now to the left.

After the tack 39 has been inserted, the shoe is for the final time moved downward and outward and is placed by a proper movement in such position that when again placed in working position the pattern pin No. 1 may be engaged by the feeding arm trigger preparatory to a feed of the shoe, as heretofore explained. This occupies the last six of the twenty-one idle movements of the lasting instrumentalities and causes the sixtieth tooth of the worm wheel 31 to be engaged by the worm 34 of the step-by-step feed mechanism. At this time the cam $C^2$ operates on the push rod 27 to release the treadle latch and the clutch U is thrown out immediately stopping the rotation of both the main shaft S and the lasting head shaft O.

It should be distinctly understood that while the foregoing description has been entirely in connection with the lasting of a McKay shoe, by the addition of the proper mechanisms to the lasting head and an obvious redesign, within the skill of the artisan, of the cams controlling the positioning of the shoe, the machine can be made to operate equally well upon welted shoes. Therefore, where the lasting operation is referred to in the appended claims or lasting instrumentalities are included as an element, these expressions are to be interpreted as referring broadly to any lasting operation and any set of lasting instrumentalities required to perform such operation, except where the context of the claim plainly specifies some particular type of lasting.

It, also, will be apparent to those skilled in the art of shoe making that many features of the invention, for example, the novel shoe feeding and positioning mechanisms, are useful in automatic machines for performing various operations on the shoe, therefore, while, for ease of explanation the foregoing description has been confined to the coöperative action of the various features of the invention in performing the lasting operation, these features will be found to be definitely stated in their true scope in the claims herewith.

In the following claims all references to position, or direction of movement of the elements, unless the claim definitely directs otherwise, are to be interpreted as terms of designation and not of limitation as obviously it is the relative position, or relative direction of movement which is alone of importance.

While the particulars of construction herein set forth are well suited to one form of the invention, it is not to be understood that these particulars are essential since they may be variously modified within the skill of the artisan without departing from the true scope of the actual invention as defined in the appended claims.

The nature and scope of the invention having been indicated, and a machine embodying the several features of the invention in their preferred form having been specifically described, what is claimed as new is:—

1. A lasting machine, having, in combination, a lasting head provided with automatically operating pincers, shoe supporting means, provision for imparting a relative movement to the pincers and shoe to transfer the point of operation of said pincers around the shoe, and means for automatically changing the relative direction of said movement during the lasting operation, substantially as described.

2. A lasting machine, having, in combination, a lasting head provided with automatically operating pincers, shoe supporting means controlled by the machine, and means to transfer the point of operation of said pincers along the sides of the fore part of the shoe successively and in a direction toward the heel on each side, substantially as described.

3. A lasting machine, having, in combination, a lasting head provided with automatically operating pincers, shoe supporting means, means for feeding the shoe past said pincers, and automatic means to change the direction of the feeding movement during the lasting operation, substantially as described.

4. A lasting machine, having, in combination, a lasting head provided with automatically operating pincers, shoe supporting means, means for presenting different portions of the upper to the pincers said means operating to feed the shoe in one direction, and means for automatically reversing the direction of feed at a predetermined time during the lasting operation, substantially as described.

5. A lasting machine, having, in combination, a lasting head provided with automatically operating pincers, means for supporting a shoe in position for the pincers to initially operate upon substantially the center of the toe of the shoe, and means controlled by the machine to transfer the point of operation of said pincers first to one side of the initial operating position for a time and then to the other side of said position without passing around the heel of the shoe, substantially as described.

6. A lasting machine, having, in combination, a lasting head provided with automatically operating pincers, shoe supporting means, means to change the angular position of the shoe relatively to the working point of said pincers, and means to transfer the point of operation of said pincers around the shoe by movements in opposite directions, during the operation of the means to change the angular position of the shoe, substantially as described.

7. A lasting machine, having, in combination, a lasting head provided with automatically operating pincers, shoe supporting means, provision for imparting a relative movement to the pincers and shoe in one plane to transfer the point of operation of said pincers around the shoe, means for changing the relative direction of said movement during the lasting operation, and provision for imparting a relative movement to the pincers and shoe in another plane and about the working point as a center to correct the positions which the shoe is caused to assume relatively to the pincers by the first named relative movement, substantially as described.

8. A lasting machine, having, in combination, a lasting head provided with automatically operating pincers, shoe supporting means, means for feeding the shoe past said pincers in two directions during the lasting operation, and means for tipping the lasting head about the working point as a center to correct the positions which the shoe is caused to assume by the operation of the feeding means, substantially as described.

9. A lasting machine, having, in combination, a lasting head provided with automatically operating pincers, shoe supporting means, provision for imparting a relative movement to the pincers and shoe to transfer the point of operation of said pincers around the shoe, means for changing the relative direction of said movement during the lasting operation, and means for imparting to the lasting head and shoe an additional relative movement to permit unobstructed passage of one part by the other while said change takes place, substantially as described.

10. A lasting machine, having, in combination, a lasting head provided with automatically operating pincers, shoe supporting means, means for feeding the shoe past said pincers, means to change the direction of feeding movement during the lasting operation, and means to move the shoe away from the lasting head while said change takes place, substantially as described.

11. A lasting machine, having, in combination, lasting pincers, operating means therefor, shoe supporting means, means to change the angular position of the shoe relative to the working point of said pincers, and means to move the shoe bodily in and out relatively to the pincers during the lasting operation, substantially as described.

12. An automatic machine, having, in combination, a tool, operating means therefor, shoe supporting means, means for feeding the shoe past the tool, and provision for lowering the shoe from the working point, changing its angular relation to said point, and returning it again to working position during the continued operation of said tool, substantially as described.

13. A lasting machine, having, in combination, lasting pincers, operating means therefor, a yieldingly supported jack, provision for feeding the shoe past the pincers, automatic means for changing the direction of feed, and provision for relieving the upward pressure on the jack at the time the direction of feed is changed to permit a lowering of the jack at that time, substantially as described.

14. A lasting machine, having, in combination, lasting pincers, operating means therefor, shoe supporting means, means to change the angular position of the shoe relatively to the working point of said pincers, and provision for moving the shoe outwardly and downwardly away from working position at a predetermined time during the lasting operation, substantially as described.

15. An automatic shoe machine, having, in combination, a tool, operating means therefor, shoe supporting means, means to change the angular position of the shoe relatively to the working point of said tool while out of working position, actuating means thereafter to move the shoe into working position, and means to lock said means against movement after the shoe has been positioned, substantially as described.

16. An automatic shoe machine, having, in combination, a tool, operating means therefor, shoe supporting means mounted for universal movement in a horizontal plane, means for rotating said shoe while out of working position to vary its angle of presentation to the tool, means for moving the shoe laterally into working position, and means for locking the shoe against further lateral movement after it has been positioned, substantially as described.

17. An automatic shoe machine, having, in combination, a tool, operating means therefor, shoe supporting means mounted for universal movement in a horizontal plane, means for moving the shoe in and out relatively to the working point of said tool, and means for predetermining the transverse location of the shoe as it is moved inward into working position, substantially as described.

18. An automatic shoe machine, having, in combination, a tool, operating means therefor, shoe supporting means mounted for universal movement in a horizontal plane, means to move the shoe in and out, means to move the shoe transversely, and provision for surrendering the control exercised by said last named means at a predetermined time during the cycle operation on the shoe, substantially as described.

19. An automatic shoe machine, having, in combination, a tool, operating means therefor, shoe supporting means mounted for universal movement in a horizontal plane, means operating constantly to control the in and out movement of the shoe, and means operating at selected periods during the cycle operation on the shoe to control the transverse movement of the shoe, substantially as described.

20. A lasting machine, having, in combination, a lasting head provided with automatically operating pincers, shoe supporting means, means operable to feed the shoe past said pincers in two directions acting to feed the shoe in one direction for a time and then in an opposite direction for a time, and means to transfer the point of operation of the pincers on the shoe from one to the other side of the starting point for said two directions of feed at the time the change in the direction of feeding movement occurs, substantially as described.

21. A lasting machine, having, in combination, a lasting head provided with automatically operating pincers, shoe supporting means, means operating on its entire perimeter to feed the shoe past said pincers by a step-by-step motion, and provision for moving the shoe past said pincers independently of said feeding means, substantially as described.

22. A lasting machine, having, in combination, lasting pincers, operating means therefor, shoe supporting means, means to move the shoe bodily in and out relatively to the working point of said pincers, means for rotating the shoe about a center within the perimeter of the sole, and means for feeding the shoe transversely relatively to said pincers, substantially as described.

23. A lasting machine, having, in combination, lasting pincers, operating means therefor, shoe supporting means, and a single feeding mechanism for imparting a relative step-by-step movement to the pincers and shoe constructed and arranged to transfer the point of operation of the pincers around the shoe in steps of varying length, substantially as described.

24. A lasting machine, having, in combination, lasting pincers, operating means therefor, shoe supporting means, and a single step-by-step shoe feeding mechanism constructed and arranged to feed the shoe past the pincers in steps of varying length, substantially as described.

25. An automatic shoe machine, having, in combination, a tool, operating means therefor, shoe supporting means, a variable step-by-step shoe feeding device including actuating mechanism adapted to impart to said device the longest desired feeding step, and means controlling the action of said actuating mechanism to cause a shorter feeding step to be imparted to said feeding device at predetermined times, substantially as described.

26. An automatic shoe machine, having, in combination, means for operating on a shoe, shoe supporting means, a step-by-step shoe feeding mechanism constructed and arranged to feed the shoe past said operating means in steps of varying length, and a pattern controlling the action of the shoe feeding mechanism whereby the length of feeding step is increased as the sides of the shoe pass said operating means and is decreased as the toe and heel pass said operating means, substantially as described.

27. A lasting machine, having, in combination, lasting pincers, a shoe support, provision for imparting a relative rotary movement to the pincers and shoe in two directions to transfer the point of operation of said pincers around the shoe, means for reversing the relative direction of rotary movement, means for shifting the relative position of the pincers and shoe laterally, and actuating mechanisms for said means constructed to act in unison, substantially as described.

28. An automatic shoe machine, having, in combination, an operating tool, a shoe support mounted for rotation relatively to said tool in both a right and left direction, actuating means for the shoe support said means being constructed and arranged to reverse the direction of rotation at predetermined times, and provision for shifting the shoe bodily laterally past the tools at the time the direction of rotation is changed, substantially as described.

29. An automatic shoe machine, having, in combination, means for operating on a shoe, a freely rotatable and bodily movable shoe support, a cam for controlling the rotation of said support constructed to reverse the direction of rotation at predetermined times, and a second cam controlling the bodily movement of said support constructed to act in unison with the first named cam, substantially as described.

30. A lasting machine, having, in combination, lasting pincers, a rotary shoe support, means to move the support in and out relatively to the pincers, and means for controlling said rotary and in and out movements in a manner to present each side of the shoe first at the ball and then at the shank to the pincers before the toe of the shoe is presented thereto, substantially as described.

31. A lasting machine, having, in combination, lasting pincers, a shoe support mounted for both rotary and universal bodily movement in a horizontal plane, and means for controlling said movements in a manner to last the sides of the shoe at the ball and shank by a transference of the point of operation of the pincers in a direction from toe to heel at each side, and to last the toe of the shoe by a transference of the point of operation of the pincers in a direction from the center of the toe outwardly at each side, substantially as described.

32. A lasting machine, having, in combination, lasting pincers, a movable shoe support, means for moving said support bodily and for rotating it in both a right and left direction, and means for controlling the movement of said support whereby the outside of the ball is first presented to the pincers, then the outside shank, then the heel, then the inside of the ball, then the inside shank, then the outside of the toe, and finally the inside of the toe, substantially as described.

33. An automatic shoe machine, having, in combination, a tool for operating on a shoe, a shoe support mounted for in and out movement relatively to the tool, a draw bar connected to said support, means acting on the draw bar to move the shoe into working position relatively to the tool, and means for clamping the draw bar against further movement during the operation of the tool, substantially as described.

34. A lasting machine, having, in combination, lasting instrumentalities, a shoe support sustained on the outer arm of a toggle bracket pivotally mounted by its inner arm, a draw bar connected to said support for controlling its in and out movement, a crank on the hub of the inner bracket arm for controlling the lateral movement of the support, an actuator adapted to engage said crank, and a cam for controlling the operation of said actuator whereby the proper working position of the shoe relatively to the lasting instrumentalities may be precisely determined, substantially as described.

35. A lasting machine, having, in combination, lasting instrumentalities, a shoe support sustained on a pivotally mounted bracket, a crank on the hub of the bracket, an actuator adapted to engage the crank and by its movement control the lateral position of the shoe, and means for holding the actuator out of engagement with the crank except when it is desired to change the lateral position of the shoe, substantially as described.

36. A lasting machine, having, in combination, lasting instrumentalities, a shoe support sustained on a pivotally mounted bracket, a crank on the hub of the bracket, means for feeding the shoe and holding the margin of the upper in working position relative to the lasting instrumentalities whereby the location of the crank is altered, an actuator adapted to engage the crank at times and by its movement control the lateral position of the shoe, means for normally maintaining the actuator and crank disengaged, and means for placing the actuator in a position to engage the crank, whatever its location may be, at the time it is desired to change the lateral position of the shoe, substantially as described.

37. A lasting machine, having, in combination, lasting pincers, a sole rest, a shoe support spring pressed against said sole rest, a plate parallelly arranged relatively to the shoe sole connected to the shoe support, a device for engaging said plate, and means for moving said device downwardly at times against the spring pressure to withdraw the shoe from its engagement with the sole rest, substantially as described.

38. A lasting machine, having, in combination, lasting instrumentalities, a shoe support, a plate parallelly arranged relatively to the shoe sole connected to the shoe support, means for feeding the shoe past the lasting instrumentalities, a clamp for engaging said plate, and actuating means for the clamp acting to release the shoe support during the shoe feeding operation and to lock the shoe support against movement during the operation of the lasting instrumentalities, substantially as described.

39. A lasting machine, having, in combination, lasting pincers, a shoe support freely movable in a horizontal plane, a horizontally arranged plate connected to said support, a clamp in vertical alinement with the point of operation of the pincers adapted to engage said plate, mechanism for changing the angle at which the shoe is presented to the pincers, and means for closing the clamp during the operation of said mechanism, whereby the shoe is turned about an axis passing through the working point, substantially as described.

40. A lasting machine, having, in combination, lasting mechanism, fastener inserting mechanism, a sole rest, a shoe support, means to yieldingly hold the shoe against the sole rest, and means for exerting an upward pressure on the shoe prior to inserting the fastener and for locking the shoe in this position during the insertion of the fastener, substantially as described.

41. A lasting machine, having, in combination, lasting instrumentalities, a movable shoe support, a pattern operatively connected with said shoe support provided with pins located in accordance with the desired location of tacks in the lasted shoe, and shoe feeding devices constructed and arranged to engage said pins successively and move the pattern and shoe support to a position to place the portion of the margin of the upper corresponding to the particular pin engaged in working position relatively to the lasting instrumentalities, substantially as described.

42. A lasting machine, having, in combination, lasting instrumentalities, a shoe support, a pin plate, having a lay-out in accordance with the number and location of the tacks to be inserted in the shoe, connected to the shoe support, a reciprocatory feeding arm for engaging said pins and feeding the shoe past the lasting instrumentalities, and a feeding arm controlling device constructed and arranged to terminate the feeding movement when the portion of the margin of the upper corresponding to the particular pin engaged is in working position relatively to the lasting instrumentalities, substantially as described.

43. An automatic shoe machine, having, in combination, means for operating on a shoe, a shoe support, a reciprocatory shoe feeding arm, a pin plate connected to the shoe support, a feed finger on said arm for engaging the pins of the pin plate, means for holding said finger normally out of engagement with said pins, a trigger adapted to engage and be moved by a pin on the idle stroke of the reciprocation of the feeding arm, and operative connections between said feed finger and trigger whereby a movement of the trigger permits the feed finger to engage a pin and move the shoe past said operating means on the feeding stroke of the reciprocation of the feeding arm, substantially as described.

44. An automatic shoe machine, having, in combination, means for operating on a shoe, a shoe feeding mechanism including a reciprocatory feeding arm constructed and arranged to feed the shoe past said operating means, means for predetermining the initial direction of movement of said feeding arm in accordance with the direction of feed desired, and a cam constructed and arranged to control the terminal point of the feeding stroke in either direction of movement, substantially as described.

45. An automatic shoe machine, having, in combination, means for operating on a shoe, and a step-by-step shoe feeding mechanism comprising a reciprocatory feeding arm, means for imparting a feeding stroke to said arm equal in length to the longest desired feeding step, and means for controlling the length of said feeding stroke whereby the shoe is fed in steps of varying length, substantially as described.

46. An automatic shoe machine, having, in combination, means for operating on a shoe, a shoe support, a step-by-step shoe feeding mechanism comprising a reciprocatory feeding arm constructed and arranged to feed the shoe by a suitable engagement with its support, said arm being normally disengaged therefrom, and means controlled by the forward stroke of the arm for placing it in shoe feeding position whereby the shoe is fed by the return stroke of the arm, substantially as described.

47. An automatic shoe machine, having, in combination, means for operating on a shoe, a shoe support, means for feeding the shoe past said operating means including a reciprocatory feeding arm, means to determine the point relative to said operating means at which the feeding movement terminates, and independent means for varying the path of feeding movement of the arm to alter said point of termination, substantially as described.

48. An automatic shoe machine, having, in combination, means for operating on a shoe, a shoe support, a step-by-step shoe feeding mechanism, means to determine the point relative to said operating means at which the feeding movement terminates, and means for varying the location of said point during the cycle of operation on the shoe, substantially as described.

49. A lasting machine, having, in combination, lasting instrumentalities, shoe supporting means, and means for imparting a relative in and out movement to the shoe support and lasting instrumentalities to separate said parts during the lasting operation and a simultaneous relative transverse movement while said parts are separated, substantially as described.

50. An automatic shoe machine, having, in combination, means for operating on a shoe, a shoe support, means to so locate the shoe that said operating means may operate upon a pre-selected portion of the margin of the shoe, means to remove the shoe from its working position, and means for returning the shoe to working position but in a location such that said operating means may operate upon a different pre-selected portion of the margin of the shoe, substantially as described.

51. A lasting machine, having, in combination, lasting instrumentalities, a shoe support, means to move the shoe support into and out of working position relatively to the lasting instrumentalities during the lasting operation, and means to move the shoe bodily transversely of the lasting instrumentalities while out of working position, substantially as described.

52. A lasting machine, having, in combination, pincer mechanism mounted for reaching movements to either side of the central position, and means to automatically control the direction of reach, substantially as described.

53. A lasting machine, having, in combination, pincers mounted to swing in a substantially vertical lateral plane, means for actuating said pincers, mechanism for controlling the initial direction of movement of the pincers, and means actuated from the driving shaft for operating said controlling mechanism, substantially as described.

54. A lasting machine, having, in combination, pincers, a horizontal rock shaft, a link connecting said pincers and rock shaft, mechanism for changing the position of the connection of said link and rock shaft to a point either above or below the shaft center, a cam for automatically controlling the operation of said mechanism, and means for operating said cam, substantially as described.

55. A lasting machine, having, in combination, lasting mechanism, fastener inserting mechanism, an edge guide comprising relatively movable members having broad and thin end bearing faces, coöperating with said mechanisms, and automatic means for imparting a relative movement to said members at predetermined times, substantially as described.

56. A lasting machine, having, in combination, means for placing an upper in overworked position on a last, an edge guide coöperating therewith provided with an upper thin end bearing face, and automatic means for moving said lower end bearing face into and out of operative position, substantially as described.

57. A lasting machine, having, in combination, lasting instrumentalities, an edge guide coöperating therewith comprising a member having a thin end bearing face and a member having a broad end bearing face slidably mounted thereon, and means for automatically moving the broad end bearing face into and out of the working plane of the thin end bearing face, substantially as described.

58. A lasting machine, having, in combination, lasting mechanism, an edge guide, automatic means for pressing the shoe against the edge guide to position it for the operation of the lasting mechanism, and means for temporarily relieving the pressure at times between the shoe and edge guide, substantially as described.

59. A lasting machine, having, in combination, lasting mechanism, a jack for the shoe, an edge guide to determine the position of the shoe relative to the lasting mechanism, means for locking the jack in the position thus determined, and means for withdrawing the edge guide from the shoe at a predetermined time during each operation of the lasting mechanism, substantially as described.

60. A lasting machine, having, in combination, lasting pincers, means for imparting updraw and overdraw movements thereto, shoe supporting means, an edge guide to determine the position of the shoe relative to the pincers, means acting automatically tending to maintain the shoe in contact with the edge guide, and means for relieving the pressure between the shoe and edge guide during the updraw movements of the pincers, substantially as described.

61. A lasting machine, having, in combination, lasting instrumentalities, an edge guide coöperating therewith having thin and broad end bearing faces, means to hold the shoe against said edge guide, and means for withdrawing at times one and at times both of said end bearing faces from the shoe, substantially as described.

62. A lasting machine, having, in combination, an edge guide coöperating therewith comprising a member having a thin end bearing face slidably mounted on the machine frame and a member having a broad end bearing face slidably mounted on the first named member, cam means, and actuating mechanism operated thereby for imparting to said members at times a relative movement and at times a movement in unison, substantially as described.

63. A lasting machine, having, in combination, mechanism for delivering long and short tacks for use at the ends and sides of the shoe respectively, an edge guide having broad and thin end bearing faces for use at the ends and sides of the shoe respectively, and an automatic selecting mechanism for simultaneously presenting to the shoe a long tack and the broad end bearing face, or a short tack and the thin end bearing face, substantially as described.

64. A lasting machine, having, in combination, mechanism for delivering different sized tacks, an edge guide adapted to present either a thin or a broad end bearing face to the shoe, cam means, and actuating mechanism operated thereby constructed and arranged to simultaneously change the size of tack delivered and the style of end bearing face presented to the shoe, substantially as described.

65. A lasting machine, having, in combination, lasting pincers, operating means therefor, shoe supporting means, and a step-by-step shoe feeding mechanism comprising a reciprocatory arm, actuating mechanism therefor and devices controlling said mechanism to cause variable reciprocations of said arm without lost motion, substantially as described.

66. A lasting machine, having, in combination, lasting pincers, operating means therefor, shoe supporting means, and a step-by-step shoe feeding mechanism comprising a reciprocatory arm and a variable throw actuator for said arm, substantially as described.

67. An automatic shoe machine, having, in combination, a tool, operating means therefor, shoe supporting means, and a step-by-step shoe feeding mechanism comprising a reciprocatory feeding arm normally in substantially vertical alinement with the tool, and means to impart a feeding movement to said arm to either side of the tool and back to center whereby either a right or left feed of the shoe may be effected, substantially as described.

68. An automatic shoe machine, having, in combination, a tool, operating means therefor, shoe supporting means, and a step-by-step shoe feeding mechanism comprising a pin pattern on the shoe support having its pins variably spaced, a reciprocatory arm adapted to engage behind the pins of said pattern and move it to feed the shoe, and means for reciprocating said arm to successively engage said pins, substantially as described.

69. An automatic shoe machine, having, in combination, a tool, operating means therefor, shoe supporting means, and a step-by-step shoe feeding mechanism comprising a pin pattern on the shoe support having a series of pins variably spaced, a reciprocatory arm adapted to engage behind the pins of said pattern successively and move it to feed the shoe, means for reciprocating said arm, and means controlling said arm reciprocating means for causing said arm to move to a position just behind the next succeeding pin of the series, whatever its spaced relation to the preceding pin, and no farther, substantially as described.

70. A lasting machine, having, in combination, lasting pincers, a shoe supporting jack, means permitting the shoe in the jack to be located so that the lasting pincers may operate upon a pre-selected portion of the upper, means permitting the shoe on the jack to be removed from its working position, and means permitting said shoe to be returned to working position but in a location such that the lasting pincers may operate upon a different pre-selected portion of the margin of the upper, substantially as described.

71. A lasting machine, having, in combination, lasting pincers, a shoe supporting jack, means permitting the shoe in the jack to be located so that the lasting pincers may operate upon a pre-selected portion of the upper, means permitting said shoe to be removed from its working position, means permitting said shoe to be returned to working position but in a location such that the lasting pincers may operate upon a different pre-selected portion of the margin of the upper, and means for relatively tipping the lasting pincers and shoe to locate the insole adjacent the pre-selected portion of the upper at the working point in a plane perpendicular to the updraw of the lasting pincers, substantially as described.

72. A lasting machine, having, in combination, lasting pincers, a shoe supporting jack, means permitting the angular position of the shoe on the jack, relatively to the working point of said pincers, to be changed while the shoe is out of working position; means permitting said shoe to be thereafter moved into working position, and means for locking said shoe against angular movement during the operating movement of the pincers, substantially as described.

73. A lasting machine, having, in combination, lasting pincers, a shoe supporting jack, means permitting the angular position of the shoe on the jack, relatively to the working point of said pincers, to be changed while the shoe is out of working position, means permitting said shoe to be thereafter moved into working position, and means for relatively tipping the lasting pincers and shoe to properly locate said shoe for the operation of the lasting pincers, substantially as described.

74. A lasting machine, having, in combination, lasting pincers, shoe supporting means mounted for universal movement in a horizontal plane, means permitting the shoe on said supporting means to be rotated while out of working position to vary its angular presentation to the pincers, means permitting said shoe to be moved laterally into working position, and means for locking said shoe against lateral movement after it has been positioned, substantially as described.

75. A lasting machine, having, in combination, lasting pincers, shoe supporting means mounted for universal movement in a horizontal plane, means permitting the shoe on said supporting means to be rotated while out of working position to vary its angular presentation to the pincers, means permitting said shoe to be moved laterally into working position, and means for locking said shoe against rotation and lateral movement after it has been positioned, substantially as described.

76. An automatic shoe machine, having, in combination, a tool for operating on a shoe, a shoe supporting jack movable to transfer the point of operation of said tool around the shoe, and means for feeding the shoe step-by-step past said tool in one direction, then continuously for a time and then step-by-step again either in the same or a reverse direction, substantially as described.

77. An automatic shoe machine, having, in combination, a tool for operating on a shoe, a shoe supporting jack movable to transfer the point of operation of said tool around the shoe, means for positioning a pre-selected portion of the shoe for the operation of said tool, and for feeding the shoe past said tool in one direction for a time, and means for again positioning a pre-selected portion of the shoe for the operation of said tool and for feeding the shoe past said tool in an opposite direction, substantially as described.

78. An automatic shoe machine, having, in combination, a tool for operating on a shoe, a shoe supporting jack movable to transfer the point of operation of said tool around the shoe, means for positioning a pre-selected portion of the shoe for the operation of said tool, and means for feeding the shoe past said tool step-by-step in one direction for a predetermined number of steps, then re-positioning the shoe and feeding it past said tool in an opposite direction for a predetermined number of steps, substantially as described.

79. An automatic shoe machine, having, in combination, a tool for operating on a shoe, a shoe supporting jack movable to transfer the point of operation of said tool around the shoe, and means for causing the tool to operate from a pre-selected point along one portion of the shoe, then separate the shoe and tool, and then operate along another portion of the shoe from the same or a different starting point, substantially as described.

80. An automatic shoe machine, having, in combination, means for operating on a shoe, a shoe supporting jack, means to rotate said jack to change the angular position of the shoe relative to the working point of said operating means, and means to move the shoe bodily in and out of its operating position relatively to said operating means during the operation on the shoe, substantially as described.

81. An automatic shoe machine, having, in combination, means for operating on a shoe and a shoe supporting jack relatively movable to transfer the point of operation of said means around the shoe, a single step-by-step feeding device, and operating mechanism for said device constructed and arranged to cause said single device to transfer the point of operation of said operating means around the entire perimeter of the shoe in steps of varying length, substantially as described.

82. An automatic shoe machine, having, in combination, means for operating on a shoe and a shoe supporting jack relatively rotatable to transfer the point of operation of said means around the shoe, means for reversing the relative direction of rotation, means for shifting the relative position of said operating means and shoe laterally, and actuating mechanisms for said last two named means constructed to act in unison, substantially as described.

83. An automatic shoe machine, having, in combination, a tool for operating on a shoe, a movable shoe supporting jack, a pattern operatively connected with the jack and provided with a series of pins arranged to indicate the portions of the shoe on which the tool is to operate, and shoe feeding devices constructed and arranged to engage said pins successively and move the pattern and jack to positions to successively place the portions of the shoe indicated by the pins in working position relatively to said tool, substantially as described.

84. An automatic shoe machine, having, in combination, a tool for operating on a shoe, a shoe supporting jack, mechanism to move the jack away from said tool during the operation on the shoe, and means to move the jack bodily transversely of the tool during the operation of said mechanism on the jack, substantially as described.

85. An automatic shoe machine, having, in combination, means for operating on a shoe, a shoe supporting jack, a step-by-step shoe feeding mechanism for transferring the point of operation of said means around the shoe comprising a reciprocating arm, an actuator for said arm, and means for causing said actuator to impart irregular throws to said arm whereby the shoe is fed in steps of varying length, substantially as described.

In testimony whereof I affix my signature, in presence of two witnesses.

ERASTUS E. WINKLEY.

Witnesses:
WARREN G. OGDEN,
RUTH A. SIMONDS.

Corrections in Letters Patent No. 1,129,373

It is hereby certified that in Letters Patent No. 1,129,373, granted February 23, 1915, upon the application of Erastus E. Winkley, of Lynn, Massachusetts, for an improvement in "Automatic Shoe-Machines," errors appear in the printed specification requiring correction as follows: Page 2, line 65, strike out the word "of," second occurrence; page 12, line 45, for the words "and plate" read *plate and;* same page, lines 64 and 119, for the word "traverse" read *transverse;* page 21, line 90, strike out the word and reference-numeral "disk 301" and insert the words and reference-numeral *fork of the link 296;* page 25, line 30, strike out the words "controlled by the machine," and same line after the word "means," second occurrence, insert the words *controlled by the machine;* page 26, line 4, after the word "automatic" insert the word *shoe;* same page, line 72, after the word "cycle" insert the word *of;* page 27, line 44, for the word "tools" read *tool;* and that the said Letters Patent should be read with these corrections therein that the same may conform to the record of the case in the Patent Office.

Signed and sealed this 30th day of March, A. D., 1915.

[SEAL.]

J. T. NEWTON,
*Acting Commissioner of Patents.*